United States Patent [19]
Beach et al.

[11] Patent Number: 5,924,077
[45] Date of Patent: Jul. 13, 1999

[54] COMPUTER BASED SYSTEM FOR MONITORING AND PROCESSING DATA COLLECTED AT THE POINT OF SALE OF GOODS AND SERVICES

[75] Inventors: David Beach, Boise, Id.; Donald Braden, Layton, Utah; Paul L. George, Westboro, Mass.; Michael Meredith, Kuna, Id.

[73] Assignee: Sapient Solutions, LLC, Boise, Id.

[21] Appl. No.: 08/581,027

[22] Filed: Dec. 29, 1995

[51] Int. Cl.⁶ .................................................... G06F 17/60
[52] U.S. Cl. .................................. 705/10; 705/7; 705/21; 707/101
[58] Field of Search .................................. 705/7, 10, 11, 705/16, 21, 24; 707/10, 101, 102, 104; 395/200.53, 200.54

[56] References Cited

U.S. PATENT DOCUMENTS

| | | | |
|---|---|---|---|
| 4,754,410 | 6/1988 | Leech et al. | 395/51 |
| 5,067,099 | 11/1991 | McCown et al. | 364/550 |
| 5,179,698 | 1/1993 | Bachman et al. | 707/4 |
| 5,189,608 | 2/1993 | Lyons et al. | 705/30 |
| 5,313,560 | 5/1994 | Maruoka et al. | 395/54 |

*Primary Examiner*—Stephen R. Tkacs
*Attorney, Agent, or Firm*—Ormiston Korfanta & Holland, PLLC

[57] ABSTRACT

An electronic storage and computing system wherein raw point of sale data is transformed into a predefined standardized configuration from which object values representing select business activities are derived and compared to predefined reference values for the selected activities. The system includes an electronic storage device for storing raw point of sale data, a data interpreter for transforming the raw data into a predefined standardized configuration, and a processor for deriving object values from the transformed data according to a set of mathematical/relational functions, the object values being representative of selected business activities, and comparing the object values to predefined reference values for the selected business activities. The data interpreter operates according to a set of control programs to selectively transfer point of sale data from a set of raw databases into a set of standard databases having a predefined standardized configuration. The mathematical/relational functions are stored in a business rule execution database wherein each function defines an object value for each business activity. A business rule execution engine, which is operatively linked to the processor and the business rule execution database, allows the processor to compute the object values for each business activity according to the corresponding mathematical/relational function, compare the object values and the corresponding reference values, and identify a pass condition representative of an acceptable comparison, a fail condition representative of an unacceptable comparison, or a warn condition representative of a questionable comparison. The identified condition is outputted from the processor and displayed to the user.

41 Claims, 22 Drawing Sheets

Microfiche Appendix Included
(1 Microfiche, 28 Pages)

Summary Data

| | | | |
|---|---|---|---|
| FA01 | 2,400 | RED | DAILY GROSS SALES |
| FA02 | 500 | GREEN | TOTAL SALES ADJUSTMENT |
| FA03 | 1,900 | RED | NET FOOD SALES |
| FA04 | 0.79 | YELLOW | NET FOOD SALES/ GROSS SALES |

Fig. 17

Detail Data

| | | | | |
|---|---|---|---|---|
| FCNTL_A1() | FA01 | DAILY GROSS SALES | 2,400 | RED |
| FCNTL_A2() | FA02 | COUPON SALES | 400 | GREEN |
| | | DISCOUNT SALES | 50 | GREEN |
| FCNTL_A3() | FA03 | NET FOOD SALES | 1,900 | RED |
| FCNTL_A4() | FA04 | NET FOOD SALES/ GROSS SALES | 0.79 | YELLOW |

COMPUTER BASED SYSTEM FOR MONITORING AND PROCESSING DATA COLLECTED AT THE POINT OF SALE OF GOODS AND SERVICES

MICROFICHE APPENDIX

This Specification includes a microfiche appendix having 1 fiche containing 28 frames.

FIELD OF THE INVENTION

The invention relates to a computer implemented system for monitoring and processing data collected at the point of sale of goods and services to facilitate the evaluation and management of related business activities. More particularly, the invention relates to an electronic storage and computing system wherein raw point of sale data is transformed into a standardized configuration from which object values representing select business activities are derived and compared to predefined reference values for the selected activities.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

With the advent of electronic point of sale terminals, cash registers and the like, large amounts of data are now gathered and stored at the point of sale of goods and services. Such data will typically include the identification of the store and terminal where sales occur, the identification and price of items sold, the date and time of sales, and the employee or cashier making the sales. In addition, electronic point of sale (POS) terminals may be programmed to make simple arithmetic computations and store the results of these computations. The extensive data gathering capabilities of modern electronic POS terminals give business managers a powerful tool in the evaluation and management of important business activities. The data gathered, computed and stored in POS terminals, however, has only minimal value in its raw form. The sheer volume of raw data that is now collected presents substantial challenges to those seeking to monitor and process that data to better manage their business activities. A further obstacle to the effective analysis and evaluation of point of sale data lies in the fact that there is no standardized format for collecting and outputting the data. Each make of electronic terminal and its associated polling package collects and outputs different bits of information in different formats or configurations. Much can be learned about the business if the point of sale data can be compiled in a useable format, analyzed and compared to desired criteria to evaluate and manage related business activities.

So far as applicants are aware, there are presently no systems or methodologies available for managing business activities by comprehensively analyzing and evaluating point of sale data. One method that has been used to analyze cash register data utilizes text files constructed from the raw data collected from the cash registers. The raw data is collected from the various cash registers and assembled into a set of text files. Data collection and text file assembly is accomplished using polling software packages such as Panasonic® Polling Software, which is used in conjunction with Panasonic® cash registers. The text files are reformatted into spreadsheets using commercially available spreadsheet software packages customized to reformat the point of sale data. The data is reformatted and analyzed by application of a set of discrete computer programs, commonly referred to as "macros." Each set of macros will typically represent one of the business activities being evaluated by the user. For example, a set of spreadsheet macros might be formulated to analyze labor productivity by identifying relevant data in the text files and then using that data to compute the desired values according to predetermined formulas.

This system of analyzing cash register data has several disadvantages. Because relevant text file data is identified by position, any changes in the text files outputted by the polling package will cause the applicable spreadsheet macros to fail unless corresponding changes are made in the macros. That is, each macro must be re-written every time a change is made to the text files. The time and expense of repeatedly re-writing the spreadsheet macros poses a significant impediment to cost effective analysis and evaluation of point of sale data. In addition, the time required to process the ever increasing amounts of data collected by point of sale terminals using current methods is prohibitive. As electronic terminals have become more powerful, they are able to collect and store more and more data. The rate at which data can be effectively analyzed using text processing and spreadsheet computations slows disproportionately to the amount of data that must be analyzed. There is also a set of calculations or relations that must be done that are not practical or, in some cases, even possible using the spreadsheet metaphor. The reports generated using this method do not alert the user to anomalous performance, nor do the reports allow the user to readily determine the cause of any anomalies. Consequently, business managers are not able to fully utilize the substantial data gathering capabilities of electronic terminals to help them evaluate and manage critical business activities.

SUMMARY OF THE INVENTION

The present invention is directed to a computer based system for more effectively monitoring and processing data collected at the point of sale of goods or services to facilitate the evaluation and management of related business activities. Accordingly, it is one object of the invention to allow business managers to more fully utilize point of sale data to evaluate and manage business activities. It is another object of the invention to reduce the time and expense required to implement changes to reference values for select business activities, formulas for computing actual values for such activities and variables used to compute those actual values. It is a further object of the invention to minimize the time required to monitor and process point of sale data. It is yet another object of the invention to alert the user to anomalous performance in select business activities and to allow the user to readily determine the cause of the anomalous performance.

These and other objects are achieved by an electronic storage and computing system wherein raw point of sale data is transformed into a predefined standardized configuration from which object values representing select business activities are derived and compared to predefined reference values for the selected activities. The results of the comparison are identified and displayed to the user. In one aspect of the invention, a computer program product is used to direct a computer in the analysis of the point of sale data. The computer program product includes a computer usable storage medium having a computer readable program code embodied therein for causing the computer to (i) transform raw data collected by the electronic point of sale terminals into a predefined standardized configuration, (ii) derive one or more object values from the transformed data, each object value being representative of a selected business activity, (iii) store a reference value for each selected business activity, and (iv) compare the object values and the corresponding reference values. In one preferred embodiment of this aspect of the invention, the computer readable program code also causes the computer to identify a pass condition representative of an acceptable comparison of object values and corresponding reference values, a fail condition representative of an unacceptable comparison of object values and corresponding reference values, or a warn condition representative of a questionable comparison of object values and corresponding reference values. The identified condition is thereafter displayed to the user.

In another version of this aspect of the invention, the computer useable storage medium has embodied therein (1) an interpreter program code for causing the computer to transform raw databases, wherein the raw point of sale data has been stored, into standard databases having a predefined standardized configuration and (2) a business rules program code for causing the computer to derive an object value from standard databases for each of one or more selected business activities and to compare the object values to corresponding predefined reference values for each selected business activity. The interpreter program code will preferably comprise one or more control programs for causing the computer to selectively transfer raw data from the raw databases to the standard databases. The control programs contain information defining the configuration of the raw databases and the configuration of the standard databases. Each control program contains a part of the definition information. This definition information includes a first scheme representative of the configuration of the raw databases to allow the control programs to cause the computer to retrieve select raw data from the raw databases, and a second scheme representative of the standard databases to allow the control programs to cause the computer to transfer data into the standard databases so that such data are accessible by the business rules program code.

The business rules program code causes the computer to store a set of mathematical/relational functions in a business rule execution database, wherein each mathematical/relational function defines an object value for each business activity, and a program code for causing the computer to link a business rule execution engine to the business rule execution database and the standard databases. The business rule execution engine is configured to cause the computer to compute an object value for each business activity according to the corresponding mathematical/relational function and compare the object values to the corresponding reference values. Again, the results of the comparison are then identified and displayed to the user as a pass condition representative of an acceptable comparison, a fail condition representative of an unacceptable comparison, or a warn condition representative of a questionable comparison.

A second aspect of the invention provides a computer system that includes (1) an electronic storage device for storing raw point of sale data, (2) a data interpreter for transforming the raw data into a predefined standardized configuration, and (3) a processor for deriving object values from the transformed data according to a set of mathematical/relational functions, the object values being representative of selected business activities, and comparing the object values to predefined reference values for the selected business activities. In one illustrative embodiment of this aspect of the invention, the data interpreter operates according to a set of control programs (summarized above) to selectively transfer point of sale data from a set of raw databases into a set of standard databases having a predefined standardized configuration. The mathematical/relational functions are stored in a business rule execution database wherein each function defines an object value for each business activity. A business rule execution engine, which is operatively linked to the processor and the business rule execution database, allows the processor to compute the object values for each business activity according to the corresponding mathematical/relational function, compare the object values and the corresponding reference values, and identify a pass condition representative of an acceptable comparison, a fail condition representative of an unacceptable comparison, or a warn condition representative of a questionable comparison. The identified condition is outputted from the processor and displayed to the user.

In a third aspect of the invention, a method for monitoring and processing point of sale data is performed on or with the aid of a programmable computer. The method of the invention comprises the steps of (1) transforming raw data collected by a plurality of electronic point of sale terminals into a predefined standardized configuration, (2) deriving one or more object values from the transformed data, each object value being representative of a selected business activity, (3) defining reference values for each of the selected business activities; and (4) comparing the object values to the corresponding reference values. Preferably, the method also includes identifying a pass condition representative of an acceptable comparison, a fail condition representative of an unacceptable comparison, or a warn condition representative of a questionable comparison and displaying the identified condition to the user.

Other objects and advantages of the present invention will become apparent to those skilled in this art from the following detailed description, wherein the preferred embodiments of the invention are described to illustrate the best mode contemplated of carrying out the invention. The invention is capable of other and different embodiments, and its several details are capable of modifications in various obvious respects, all without departing from the scope of the invention. Accordingly, the drawings and description are to be regarded as illustrative in nature and not as restrictive.

BRIEF DESCRIPTION OF THE DRAWINGS

FIG. 17 is a pictorial representation of the third level of results displayed to the user wherein the computations and comparisons made by the business rules subsystem are summarized.

FIG. 18 is a pictorial representation of the third level of results displayed to the user wherein the computations and comparisons made by the business rules subsystem are detailed.

DETAILED DESCRIPTION OF THE PREFERRED EMBODIMENTS

The preferred embodiments of the invention disclosed herein operate using a programmable IBM® compatible 80486 or higher speed personal computer. Processing may be performed using MS-DOS® or MS-Windows™/DOS compatible operating systems. Information is displayed to the user through a MS-MS-Windows™ operating system. Other computer equipment and operating systems may be used with some modifications to the system software. The programing elements of the preferred embodiments are written primarily in XBASE, an open system database language, and Visual Basic™. The invention is incorporated into software commercially available under the name Management Alert™ produced by Sapient Solutions, LLC of Boise, Idaho.

SYSTEM OVERVIEW

Figure 1:
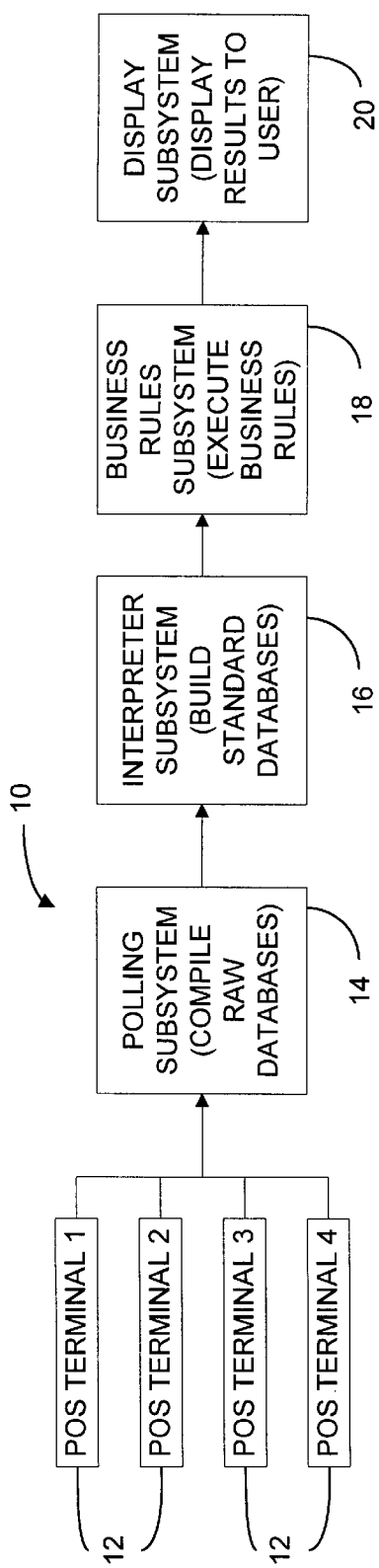
FIG. 1 is a block diagram illustrating the basic components of the invention.

FIG. 1 is a block diagram and flow chart illustrating the basic components of the management alert system, designated generally by reference numeral 10. Electronic point of sale ("POS") terminals 12, typically cash registers, record data at the point of sale of goods and services. A polling subsystem 14 collects the raw data from the POS terminals 12. An interpreter subsystem 16 linked to the polling subsystem 14 transforms the raw data into a set of databases having a predefined standardized configuration. A business rules subsystem 18 operates on the standard databases to (I) compute object values representing select business activities, (ii) compare the object values to corresponding predefined reference values for each business activity, and (iii) identify a pass condition representative of an acceptable comparison, a fail condition representative of an unacceptable comparison, or a warn condition representative of a questionable comparison. A display subsystem 20 visually and/or audibly alerts the user to the identified condition.

The polling subsystem 14 collects raw data from the POS terminals 12 using commercially available polling software packages. The polling subsystem converts the raw data from compressed binary files into a set of open system databases. All data is thereafter processed in database format. The polled raw data is copied into a directory wherein the raw data is stored according to the date on which it was polled and the store from which it was polled.

The interpreter subsystem 16 creates a set of hardware independent standard databases through the systematic grouping of select raw data and, where necessary, through the computation of other data not directly present in the raw data. The data that will appear in the standard databases is determined by and constitutes the required inputs to the business rule functions. The interpreter subsystem 16 includes a set of control programs coded for a particular type of electronic terminal and associated polling package. The control programs are, therefore, hardware dependent. The control programs are coded to "know" what data must appear in the standard databases and to "understand" the polled raw data. In this way, the control programs know what raw data to find and where to find it. Once the raw data from the POS terminal has been transformed and stored in the standard databases, all subsequent processing may be performed using a set of generic programs that are not hardware dependent.

The transformed data in the standard databases is processed by the business rules subsystem 18. This subsystem computes object values representative of select business activities as defined by a set of business rule functions, compares the object values to corresponding predefined reference values, and identifies the comparison as a pass condition representing an acceptable comparison, a fail condition representing an unacceptable comparison or a warn condition representing a questionable comparison. The identified conditions, the object values and reference values and the underlying data for each business activity are stored in a set of summary and detailed databases.

The display subsystem 20 responds to the identified conditions and alerts the user to the identified condition. The user can then view or print the data in the summary and detail databases as well as generate a variety of customized reports, as desired, to evaluate any business activity of interest.

Figure 2:
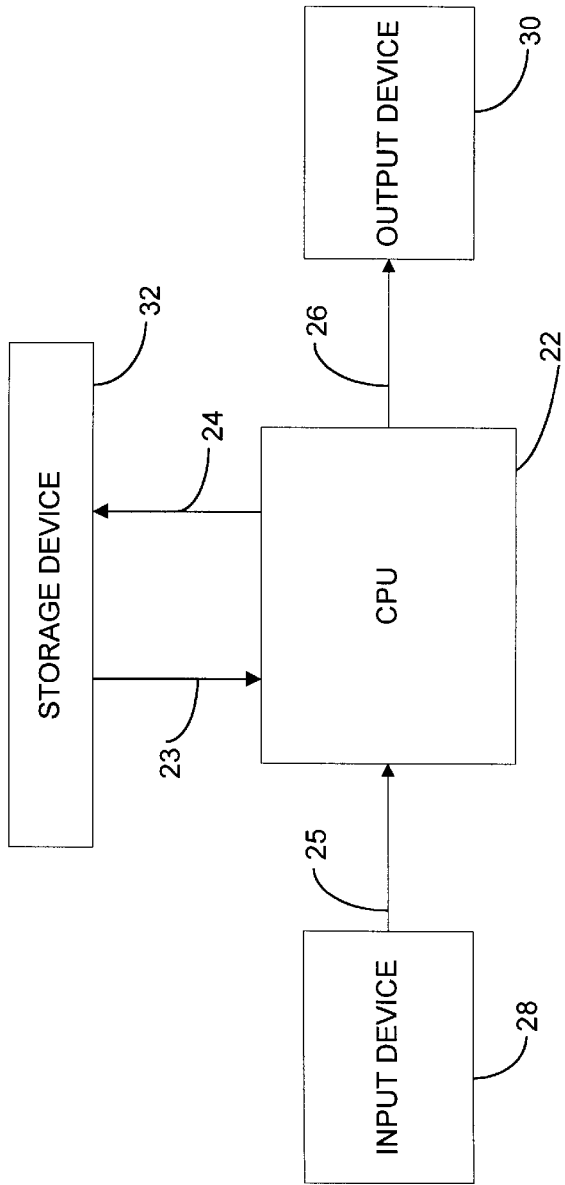
FIG. 2 is a schematic diagram generally illustrating a computer system through which the invention is implemented.
Figure 3:
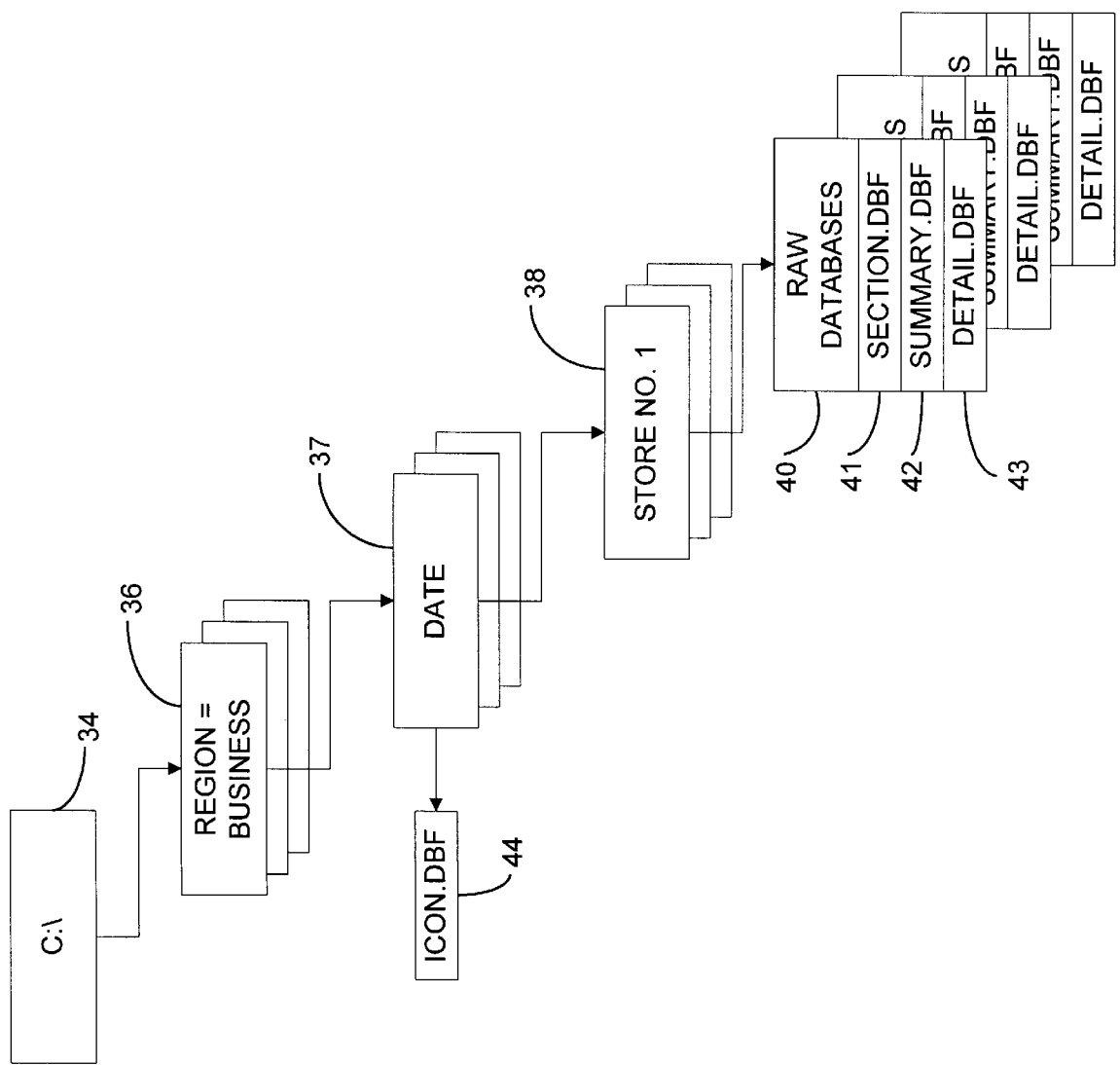
FIG. 3 is a block diagram of the directory structure for storing data according to the invention.

FIG. 2 illustrates a typical computer system that may be used to implement the invention. A central processing unit (CPU) 22 is electronically coupled through an input/output (I/O) controller, represented schematically by lines 23–26, to an input device 28, an output device 30, and a storage device 32. Input device 28 represents conventional character input means such as a keyboard, mouse and/or modem. Output device 30 represents conventional character output means such as a display monitor/screen, printer or modem. Storage device 32 may be any conventional data storage means such as a hard disk drive, an array of disk drives or a tape drive. The memory space of the storage device 32, a disk for example, is logically organized into partitions, which represent a number of cylinders of the disk and are usually identified by a letter from C to Z. Each partition 34 may be broken down into directories 38—38 and files 40–44, as illustrated in FIG. 3, wherein the polled raw data is stored according to the date on which the data was polled and the store from which it was polled.

POLLING SUBSYSTEM

Figure 4:
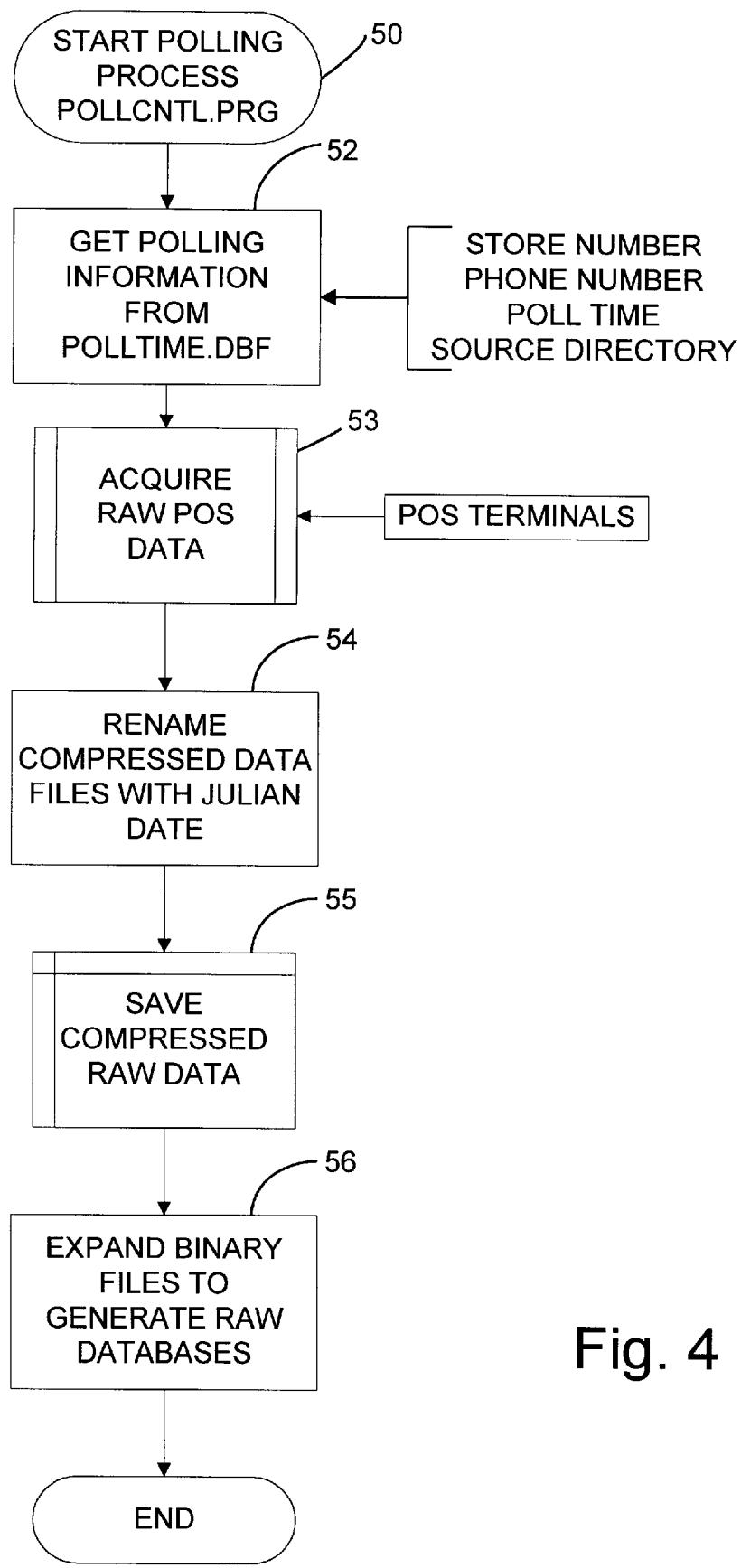
FIG. 4 is a flow chart illustrating the process through which the raw point of sale data is compiled and stored.

The polling subsystem collects raw data from the POS terminals and converts the raw data into a set of open system databases. The polling process is directed by a control program designated POLLCNTL. When store polling is to begin, the POLLCNTL program is loaded into the CPU. The CPU program counter is set to the beginning of the poll control program and the CPU begins executing the program instructions. The polling process is illustrated in FIG. 4. The actual polling of the POS terminals is accomplished by any commercially available polling software package that outputs data in an open system database format and is compatible with the POS terminals being polled. For example, Panasonic® Polling Software would be used to interface with Panasonic® 7500 and 5000 series POS terminals which are in widespread use throughout the United States. Any open system database format can be used as long as the configuration of the database is known. To the extent the details of the present invention are dependent on a specific open system database format, the XBASE format, which represents the largest open system database format currently available, is used in the preferred embodiments of the invention described herein. As noted, however, any open system database format may be used as long as its configuration is known.

The poll control program is itself controlled by a data file, designated POLLTIME.DBF, which contains the times to conduct the poll, the stores to poll, the path name to the polled file and various other polling control information. Referring to FIG. 4, the polling program POLLCNTL, using the data from POLLTIME.DBF, causes the CPU to begin to execute the Panasonic® Polling Software program (steps 50–53). Data is collected through the computer's modem via phone lines or a direct "hardwire" connection to each store being polled. As the data is collected, the polling program causes the CPU to output the data to the storage device where it is stored in a polling directory in compressed binary files according to the store number and polling date (steps 54,55). Once all the data is collected, the compressed binary files are expanded into open system database files according to an expansion algorithm in the PanaPoll® program (step 56). The open system database files, which are stored according to the directory structure shown in FIG. 3, are referred to herein as "raw" databases.

INTERPRETER SUBSYSTEM

The interpreter subsystem includes a set of control programs that transform the raw databases outputted by the polling subsystem into a set of "standard" databases having a predefined standardized configuration so the data can be further processed by the business rules subsystem. The standard databases contain values for the variables used in the business rule functions. The control programs group select raw data and, where necessary to support the business rule functions, compute other data not directly present in the raw data. This data is stored in the standard databases. The control programs contain information defining the configuration of the raw databases and the desired configuration of the standard databases. Each control program contains a part of this definition information. The definition information includes a first scheme representative of the configuration of the raw databases to allow the control programs to retrieve select raw data. The definition information also includes a second scheme representative of the configuration of the standard databases to allow the control programs to transfer data into the standard databases so that the data is accessible by the business rules subsystem. The control programs are coded to define the configuration of the XBASE databases used in the preferred embodiments of the invention. If other database configurations are used to store the raw data, then the control programs would be coded to define the particular configuration used.

Conventional read and write operations are used throughout the Management Alert™ system programming operations. Read operations are used to transfer data from the storage device into the CPU memory and write operations are used to transfer data from the CPU memory to the storage device. When a control program issues a READ command, the CPU decodes the READ command and issues a series of BIOS commands to the I/O controller. These BIOS commands include a register number containing a physical data block number and a register number containing a CPU memory address. The I/O controller breaks the block number down into its components—cylinder, head and sector addresses for a disk drive type storage device—to locate the data block in the storage device and transfers the data to the assigned CPU memory address. When a control program issues a WRITE command, the CPU decodes the WRITE command and issues BIOS commands to the I/O controller. Again, these BIOS commands include a register number containing a physical data block number and a register number containing the CPU memory address. The I/O controller locates the data block in the CPU memory and transfers the data to the specified address in the storage device. These read and write operations, which are well known to those skilled in the art, are summarized herein merely to better illustrate the flow of data to and from the computer storage device and the CPU.

As shown in FIG. 3, the raw databases for each business group or entity are stored in the directory according to the date on which the data was polled and the store from which the data was polled. The directory includes a polling date for each day of the year. The actual number of stores present in the directory is determined by the particular business with which the system is used. The Icon database 44, designated ICON.DBF, is also stored in the directory at the date level. The Section, Summary and Detail databases 41–43, designated SECTION.DBF, SUMMARY.DBF and DETAIL.DBF, respectively, are stored in the directory at the store level. Each of these databases is described below in conjunction with the business rules and display subsystems.

Each element of raw data reflects a unique event, total, count, percentage and the like recorded by the POS terminals. The standard databases are constructed to group together related raw data elements in a way that is meaningful to and useable by the business rules subsystem. In order to illustrate the operation of the interpreter subsystem and construction of standard databases, exemplary raw databases, interpreter configuration files, control programs and standard databases are described below for a fast food service business using Panasonic® 7500 model series POS terminals whose data has been polled using the Panasonic® Polling Software. The standard databases may then be used by the business rules subsystem to compute object values for various business activities. As will be apparent to those persons skilled in the art of software engineering, these files, programs and databases can be adapted for any of the various businesses and POS terminals that generate data at the point of sale of goods or services. Some or all of the relationships set forth below may differ for other types of POS terminals. Although only the financial controls standard databases are constructed herein to illustrate the structure and method of the interpreter subsystem, other standard database groups may be constructed. For example, in the Management Alert™ product that is commercially available, standard database sets are constructed to monitor and process hourly production, labor, sales by department/group, price look up (PLU) group, customer service time and promotional sales activities. Databases are also sometimes referred to herein as "database files" or "data files." Computer control programs are designated by the suffix "PRG" and databases are designated by the suffix "DBF".

Figure 5:
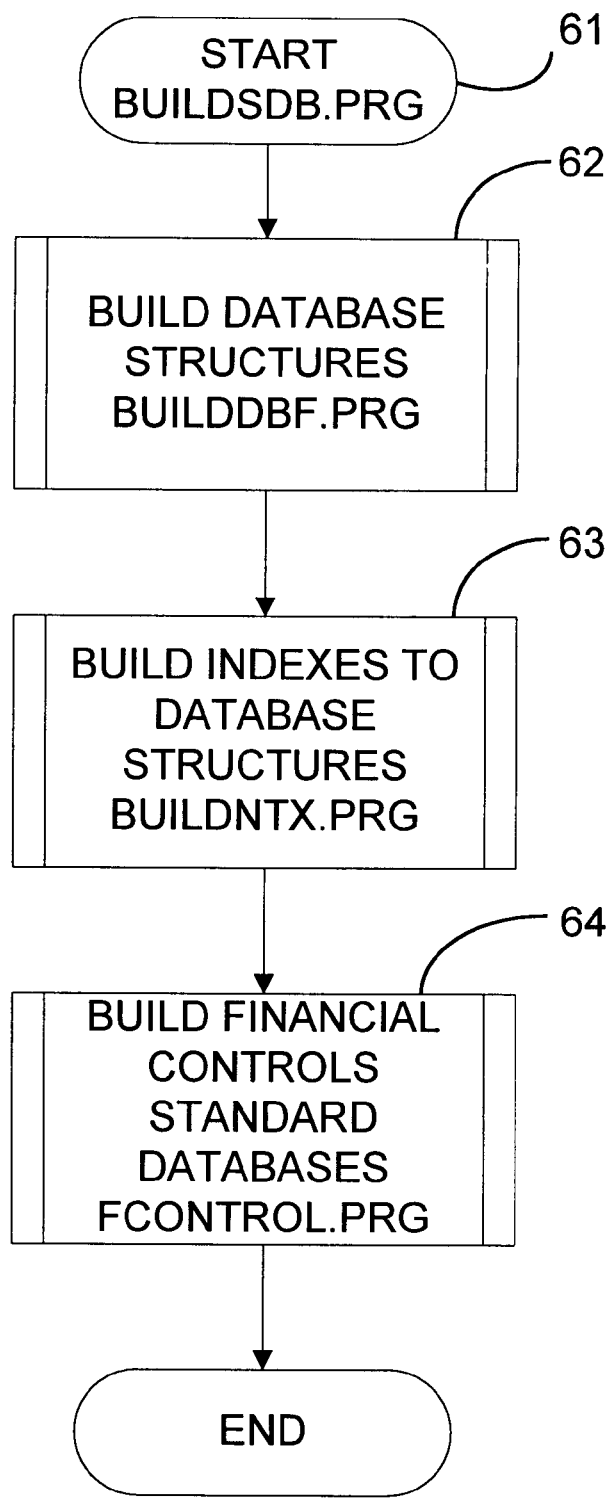
FIG. 5 is a flow chart illustrating the basic process through which the interpreter subsystem constructs the standard databases.
Figure 9:
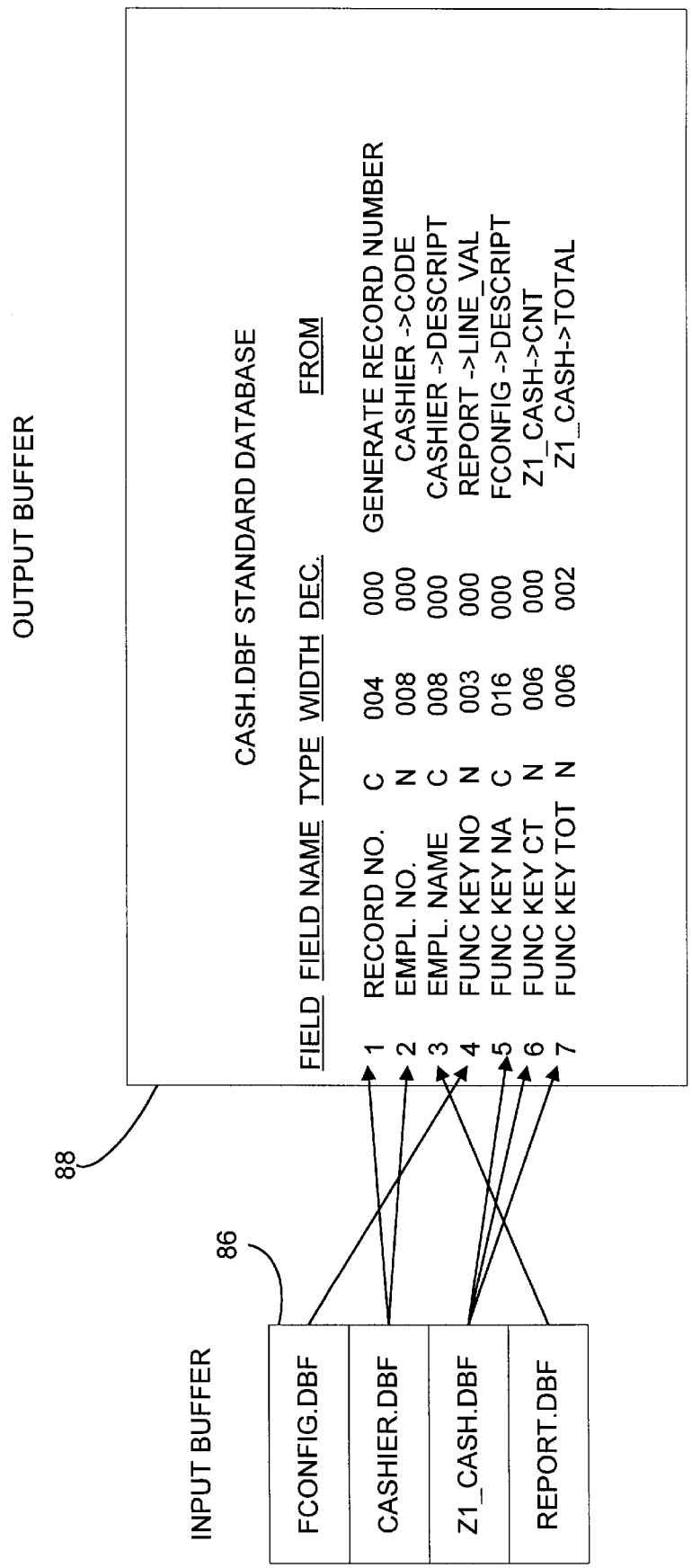
FIG. 9 is a schematic diagram illustrating an exemplary set of data groups in the CPU input and output buffers during implementation of the interpreter subsystem process flow.

The process of building the standard databases is controlled by a program designated BUILDSDB.PRG. Referring to FIG. 5, the process starts by building the definition of the standard database structures and indexes (steps 61—61). In step 62, BUILDDBF.PRG defines the standard database structures by specifying the data that will be included in each database. For example, and as best seen in FIG. 9, the cash standard database, designated CASH.DBF, is configured according to the code sequence set forth below to include cashier names and employee numbers and POS terminal function key numbers, descriptions, counts and totals.

```
FUNCTION BUILDDBF()
#INCLUDE #FILEIO.CH"
#INCLUDE "DBSTRUCT.CH"
* CASH.DBF EXAMPLE
   nHANDLE := FOPEN("CASH.DBF",FO_READ)
   IF ERROR() = 2
   * Build the CASH.DBF if it doesn't exist
      aDbF := {}
      AADD(aDbf, {"RECNO",    "C",   4,   0})
      AADD(aDbf, {"EMP_NO",   "N",   8,   0})
      AADD(aDbf, {"EMP_NAME", "C",   8,   0})
      AADD(aDbf, {"FUNC_NO",  "N",   3,   0})
      AADD(aDbf, {"NAME",     "C",  16,   0})
      AADD(aDbf, {"CNTR",     "N",   6,   0})
      AADD(aDbf, {"TOTAL",    "N",   2,   0})
      Dbcreate("CASH.DBF", aDBF)
   ENDIF
   FCLOSE(nHANDLE)
```

In step 63, the BUILDNDX.PRG builds indexes for each standard database according to the following exemplary code sequence.

```
FUNCTION BUILDNTX()
   OPEN CASH
   INDEX ON STR(RECNO(), 4) TO CASH1
   CLOSE CASH
```

Figure 6:
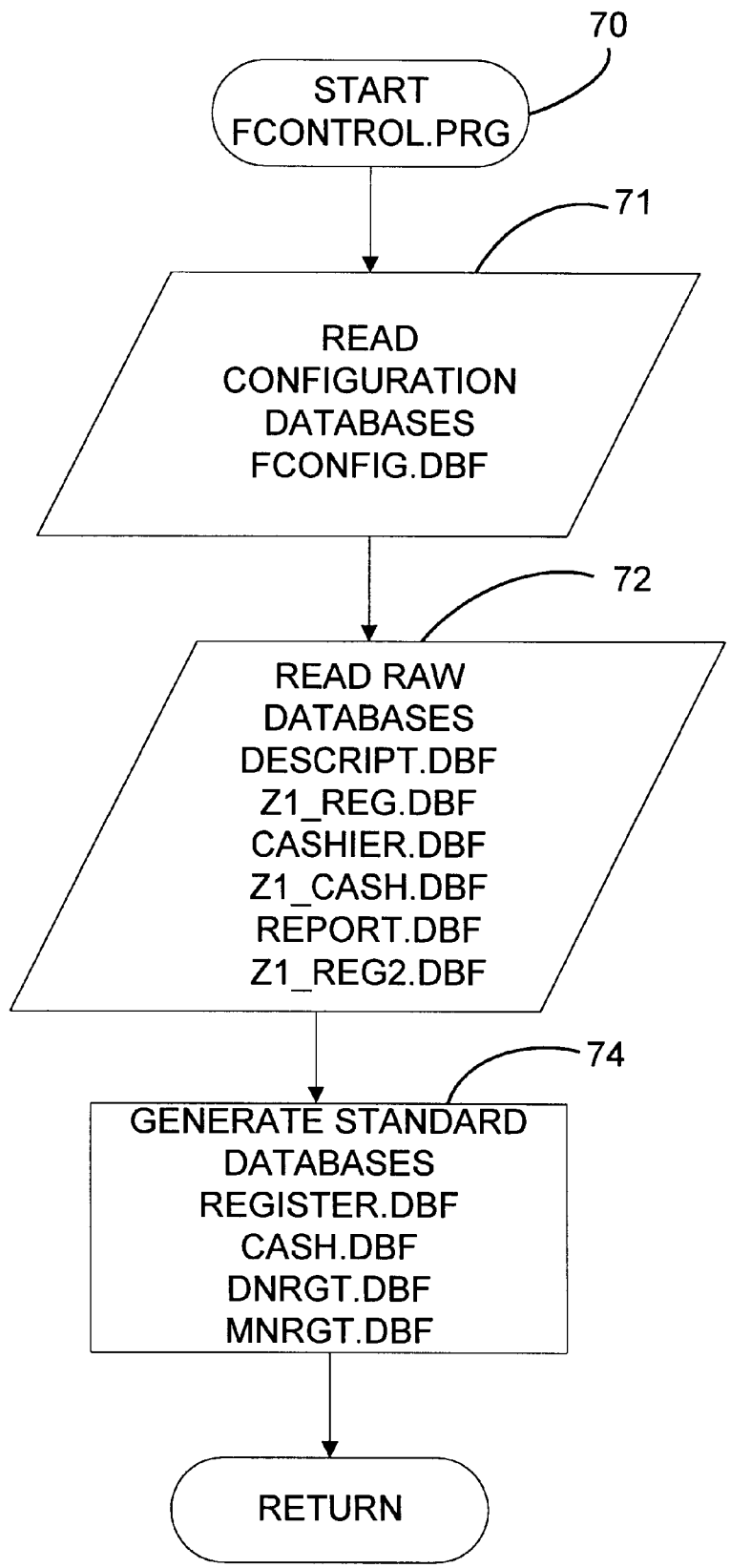
FIG. 6 is a flow chart illustrating further details of the process through which the interpreter subsystem constructs the standard databases.

The next step 64 in the process of building the standard databases is to populate the empty database structures with the appropriate data from the raw databases. Again, the further details of the interpreter subsystem will be descibed with reference to the construction of the financial controls standard databases as an exemplary illustration of this aspect of the invention. FIG. 6 shows the basic process steps to construct the financial controls standard databases. This process is further detailed in FIGS. 7–9 and in the discussion that follows.

The FCONTROL.PRG uses the following configuration data file and polled raw databases to populate the financial control standard databases:

FCONFIG.DBF is a configuration database through which the user may assign full name descriptions, up to 16 characters, to each function key on the POS terminal;

DESCRIPT.DBF is a raw database that contains a name description of each function key on the POS terminal using up to 8 characters;

Z1_REG.DBF is a raw database that records the totals and counts for all assigned function keys;

CASHIER.DBF is a raw database that records all the cashiers by employee number and name;

Z1_CASH.DBF is a raw database that records the function key counts and totals for each cashier;

REPORT.DBF is a raw database containing a numeric field used to determine the order of the totals and counts in Z1_REG.DBF and Z1_CASH.DBF; and Z1_REG2.DBF is a raw database that records the non-resetting grand totals and all deposit information.

The FCONTROL.PRG program constructs the following standard databases:

REGISTER.DBF is a standard database that records the totals and counts for all assigned function keys. The database contains one record for each assigned function key on the POS terminal. Each record contains the following data:

Field No. 1—Record Number;

Field No. 2—Function Key Number;

Field No. 3—Function Key Description/Name;

Field No. 4—Function Key Count; and

Field No. 5—Function Key Total.

CASH.DBF is a standard database that records the totals and counts for all assigned function keys for each cashier. Each cashier is identified by employee number and name. The database contains one record for each cashier for each function key on the POS terminal. Each record contains the following data:

Field No. 1—Record Number;

Field No. 2—Employee Number;

Field No. 3—Employee Name;

Field No. 4—Function Key Number;

Field No. 5—Function Key Description/Name;

Field No. 6—Function Key Count; and

Field No. 7—Function Key Total.

DNRGT.DBF is a standard database of daily non-resetting grand totals and deposits copied directly from the Z1_REG2.DBF raw database.

MNRGT.DBF is a standard database of the monthly non-resetting grand totals and deposits copied directly from the Z1_REG2.DBF raw database at the beginning of the month.

Figure 7:
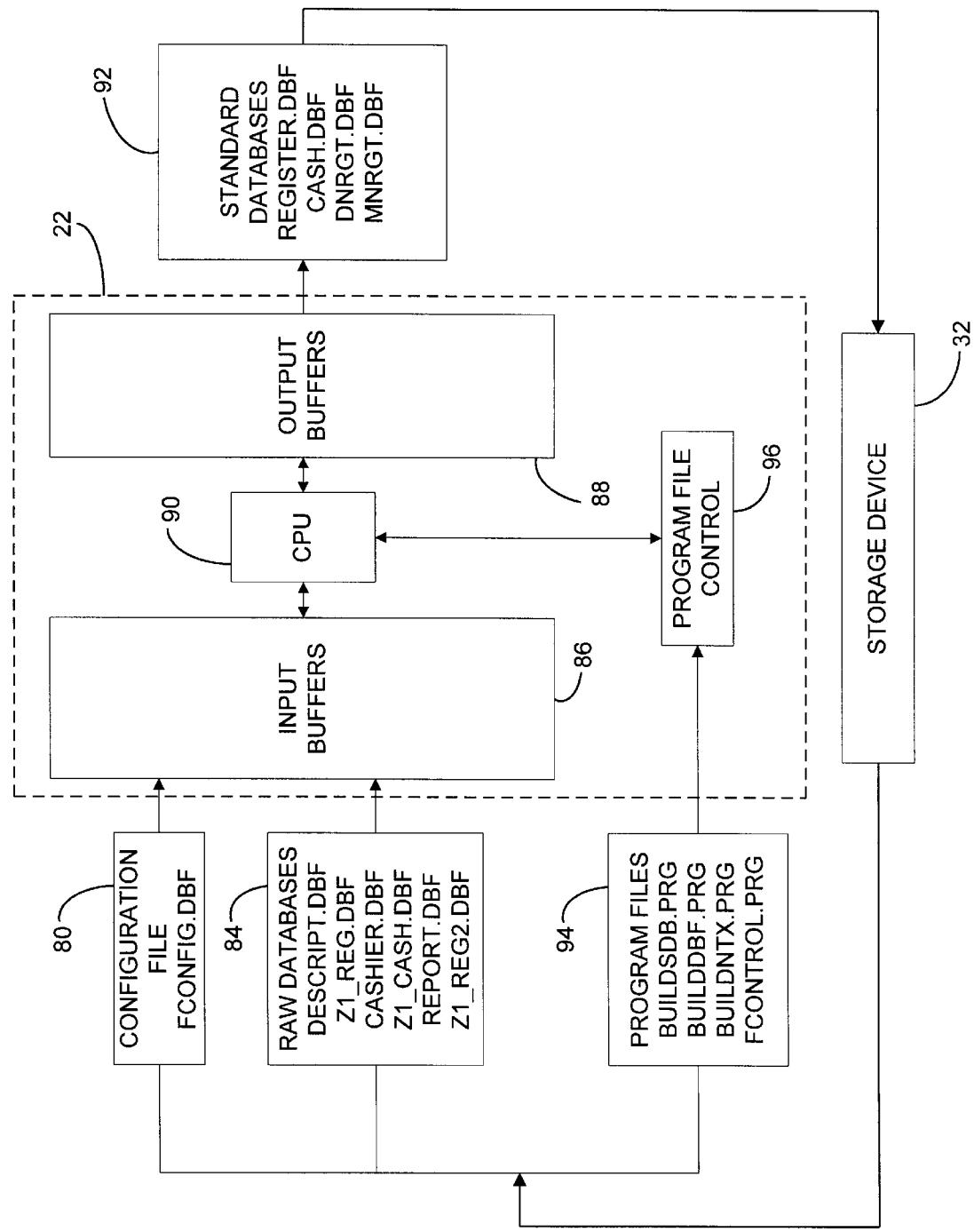
FIG. 7 is a schematic diagram illustrating interpreter subsystem data flow through the computer system components used to implement the invention.

Referring now to FIGS. 6 and 7, configuration file 80 and the index files 82 are read into the CPU memory from the storage device 32, as are the raw databases 84 that are needed to construct these standard databases (steps 70–73). Program files 94 are controlled in the CPU's program file control 96. As the data is transferred into CPU memory, it is organized into input buffers 86 that are assigned to the individual files. The configuration file 80 and raw databases 84 are read into CPU memory one logical record at a time. Each buffer is structured to match the actual database record, including the name and attribute of each field in the record. Each time the control program requires a new data record, a buffer pointer is set to the beginning of the buffer and a new record is acquired. In this way, every record is maintained in CPU memory. The CPU memory is allocated to a specific use as a set of buffers, pointers and program references. The data read from the storage device into the input buffers is processed in the CPU processing means 90 according to the control program logic to acquire or compute the records for the standard databases 92, which are written from the CPU memory output buffers 88 back to the storage device 32 (step 74). CPU processing means 90 represents generally the various conventional internal components of CPU 22 necessary to execute the program code instructions (e.g., BIOS control, arithmetic/logic unit, memory buses, and short term memory registers). These components and their operation are well known to those skilled in the art of computer operations.

The steps of the FCONTROL.PRG control program that generate the financial controls standard databases will now be described with reference to FIGS. 8A–8G. Referring first to FIG. 8A–8D, the REGISTER.DBF, CASH.DBF, DNRGT.DBF and MNRGT.DBF standard databases are opened, cleared of all preexisting data and closed (steps 101–104). The REGISTER.DBF standard database is constructed according to steps 105–120. The REPORT.DBF and Z1_REG.DBF raw databases, the FCONFIG.DBF configuration file and the REGISTER.DBF and standard database are opened (step 105). The POS terminal function key number is transferred from the REPORT.DBF raw database to REGISTER.DBF and the corresponding mnemonic description assigned from the FCONFIG.DBF configuration database (steps 106–113). The POS terminal function key count and total is then transferred from Z1_REG.DBF to REGISTER.DBF (steps 113–119). These steps are repeated through a "do loop" until the required data for each function key on the POS terminal has been transferred to REGISTER.DBF. The databases are then closed (step 120).

The CASH.DBF standard database is constructed according to the steps 121–142 shown on FIGS. 8E–8H. The CASHIER.DBF, Z1_CASH.DBF and REPORT.DBF raw databases, the FCONFIG.DBF configuration file and the CASH.DBF standard database are opened (step 121). The cashiers' name and employee number is transferred from the CASHIER.DBF raw database to the CASH.DBF standard database (step 123–127). The POS terminal function key number is then transferred from the REPORT.DBF raw database to the CASH.DBF standard database and the corresponding mnemonic description assigned from the FCONFIG.DBF configuration database (steps 128–134). Then, the POS terminal function key count and total for that cashier is transferred from the Z1_CASH.DBF raw database to the CASH.DBF standard database (step 135–137). These steps are repeated through a set of "do loops" until the required data for each cashier and each function key on the POS terminal has been transferred to CASH.DBF. The source of each element of data in each record of the CASH.DBF standard database, as described in detail above, is illustrated in FIG. 9 as the corresponding data flows into the input buffer 86 in the CPU memory after which it is process and transferred into a CPU memory output buffer 88.

For ease of programming, and as shown on the appended program listing, the REPORT.DBF may be split into two databases—the REG_FUNC.DBF and CSH_FUNC.DBF intermediate standard databases—to separately identify the function keys relating to each POS terminals and each cashier, respectively. REG_FUNC.DBF may then be used to construct REGISTER.DBF and CSH_FUNC.DBF may be used to construct CASH.DBF. In addition, the mnemonic descriptions for the POS terminal function keys may be assigned from the DESCRIPT.DBF raw database rather than from the FCONFIG.DBF standard configuration database.

Figure 8A:
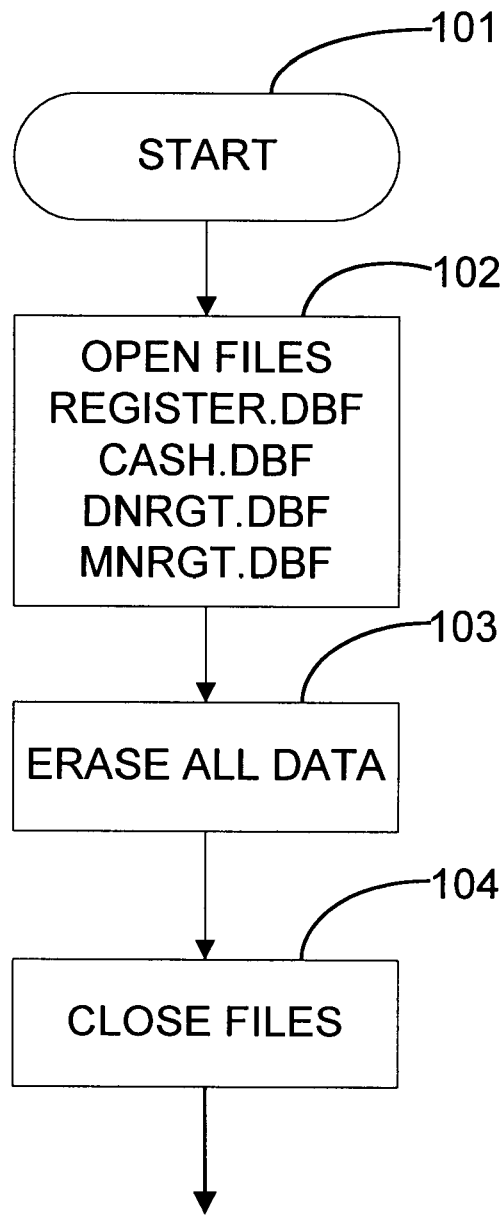
FIGS. 8A–8H are flow charts detailing the process for constructing one exemplary set of standard databases.
Figure 8B:
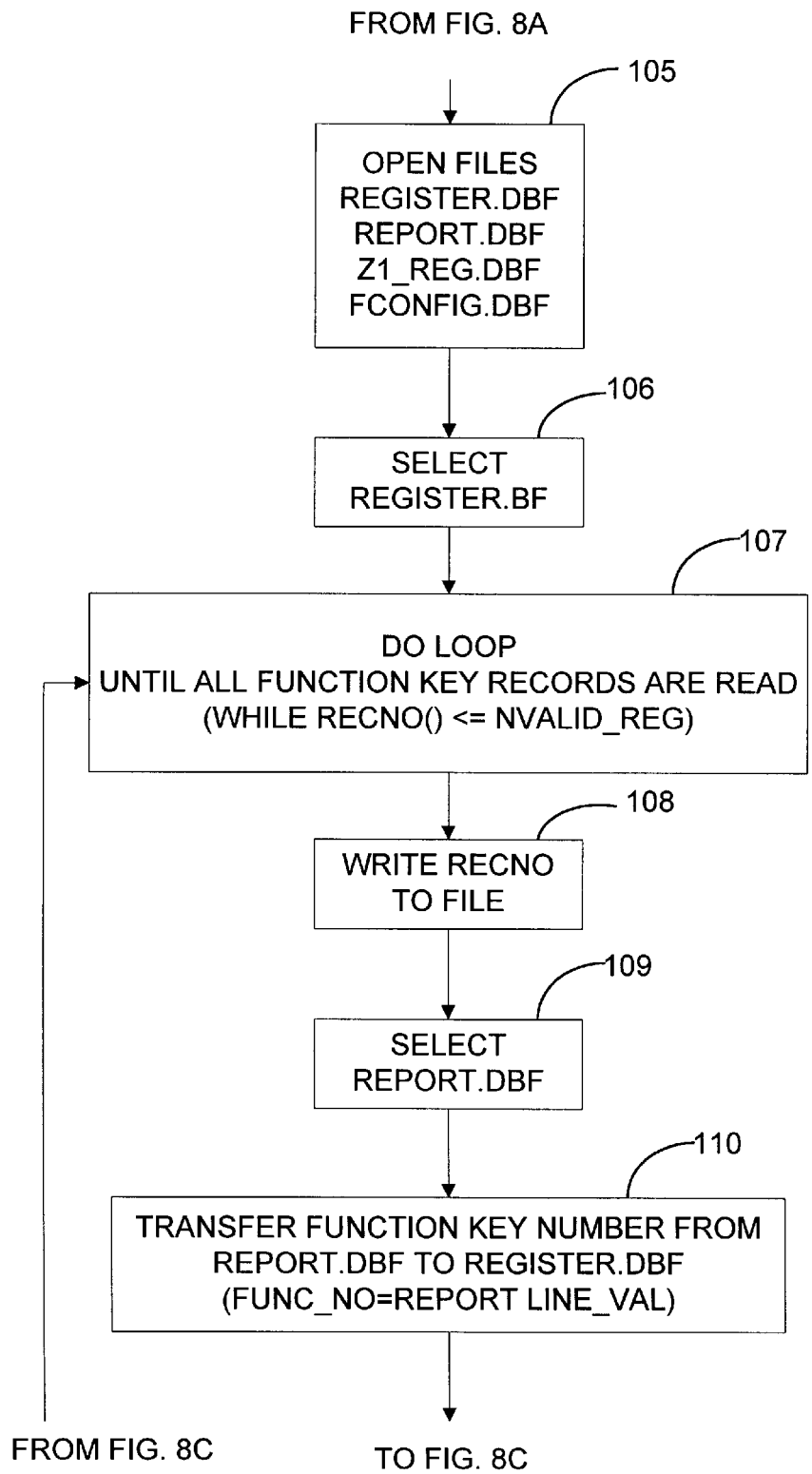
Figure 8C:
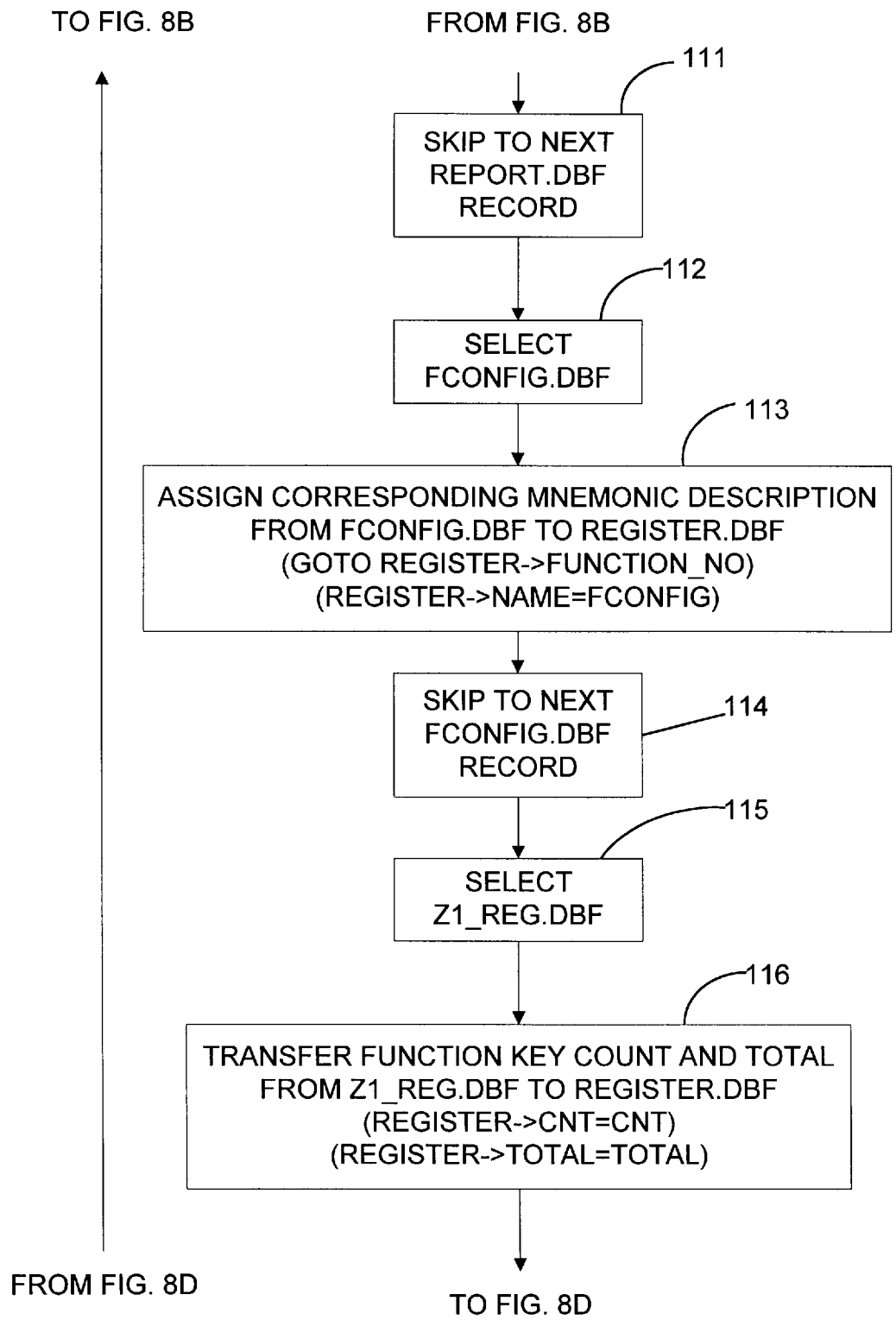
Figure 8D:
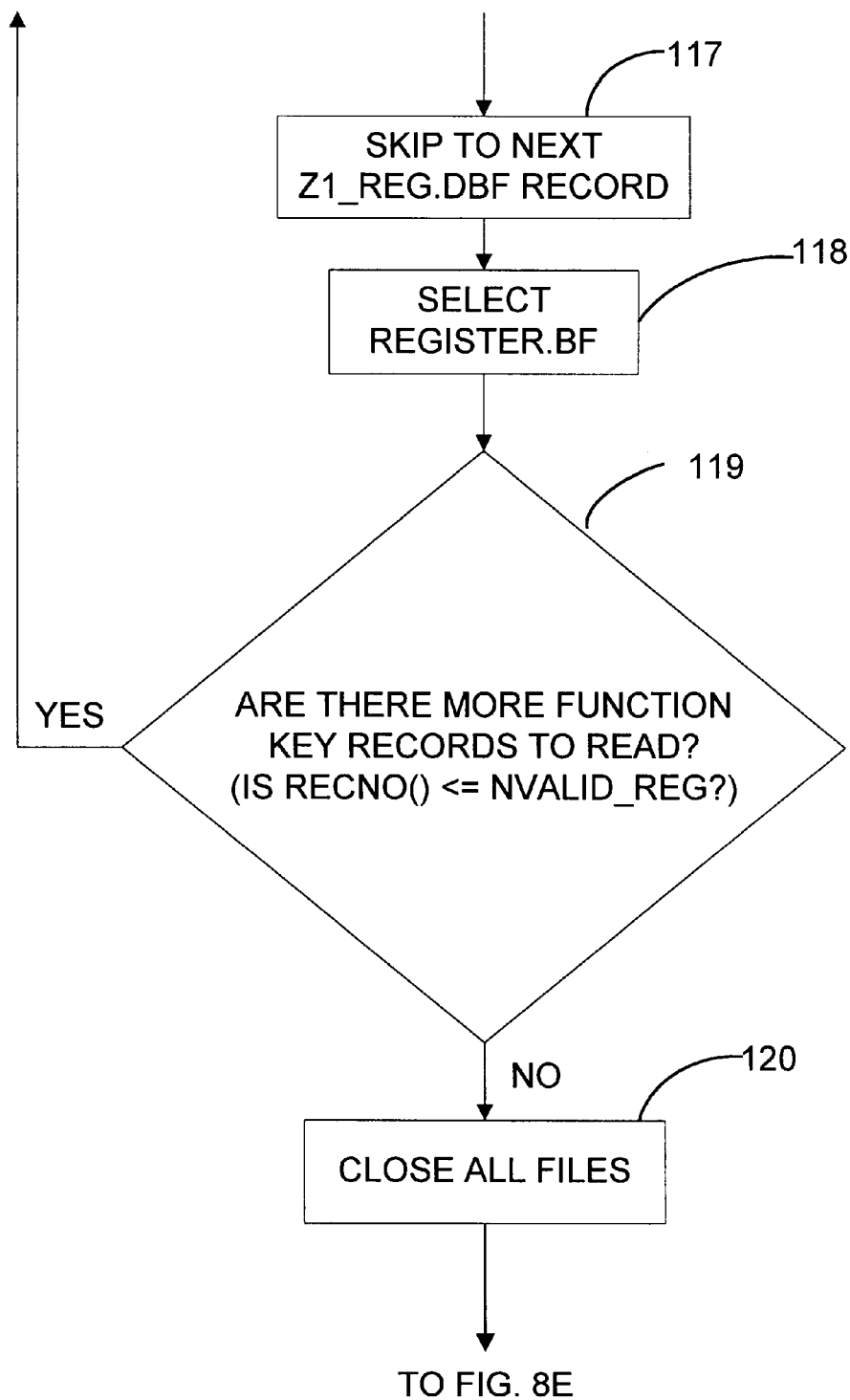
Figure 8E:
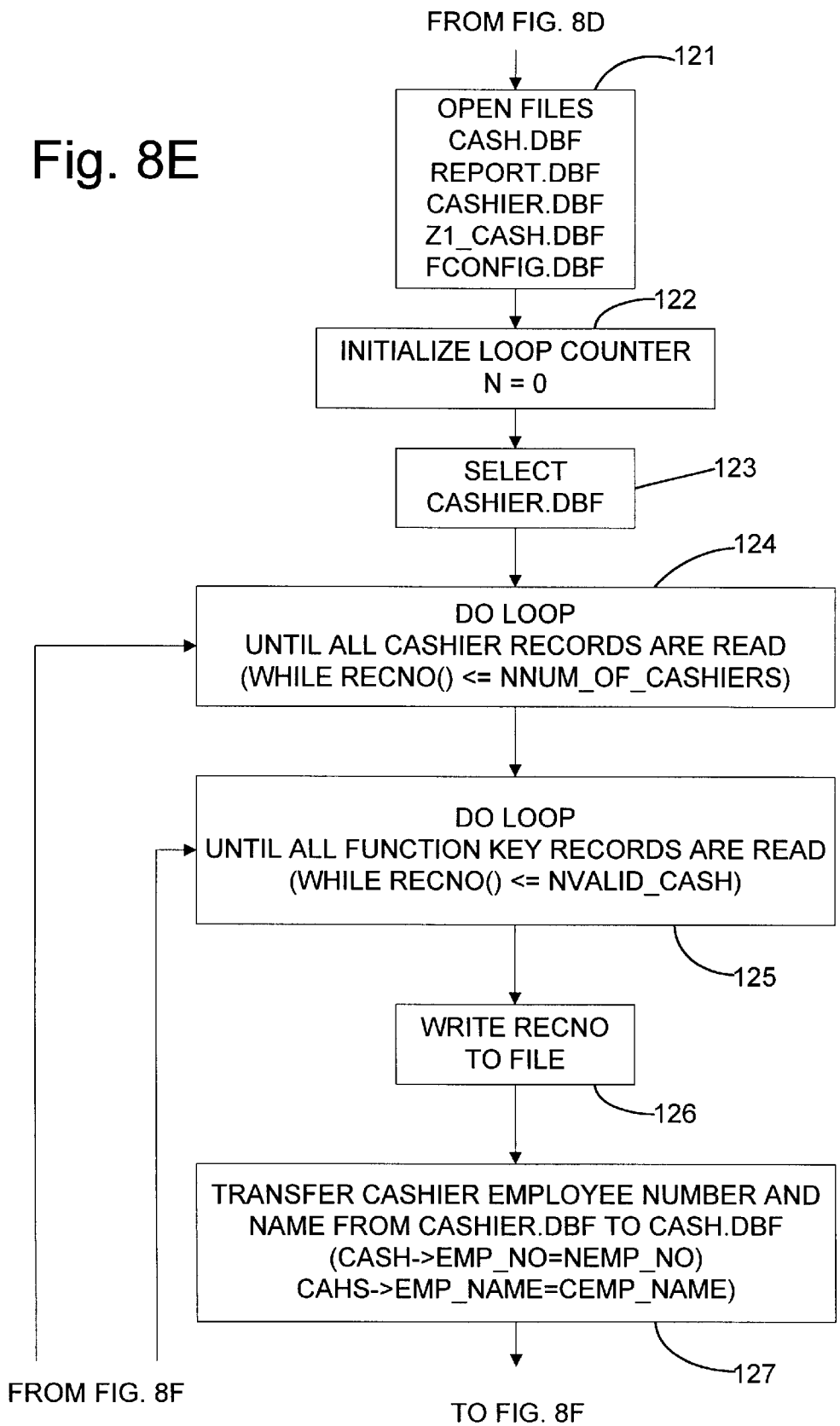
Figure 8F:
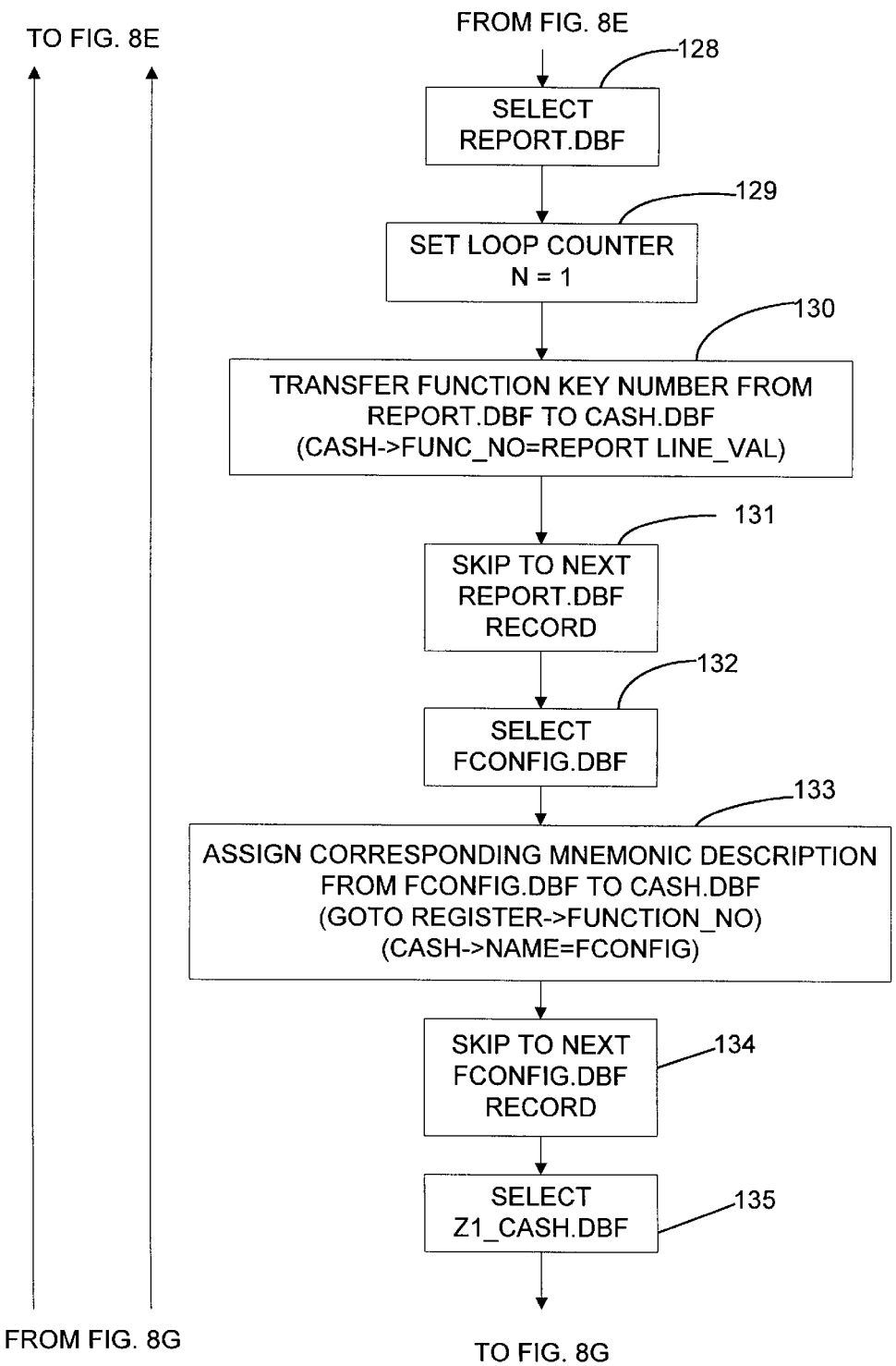
Figure 8G:
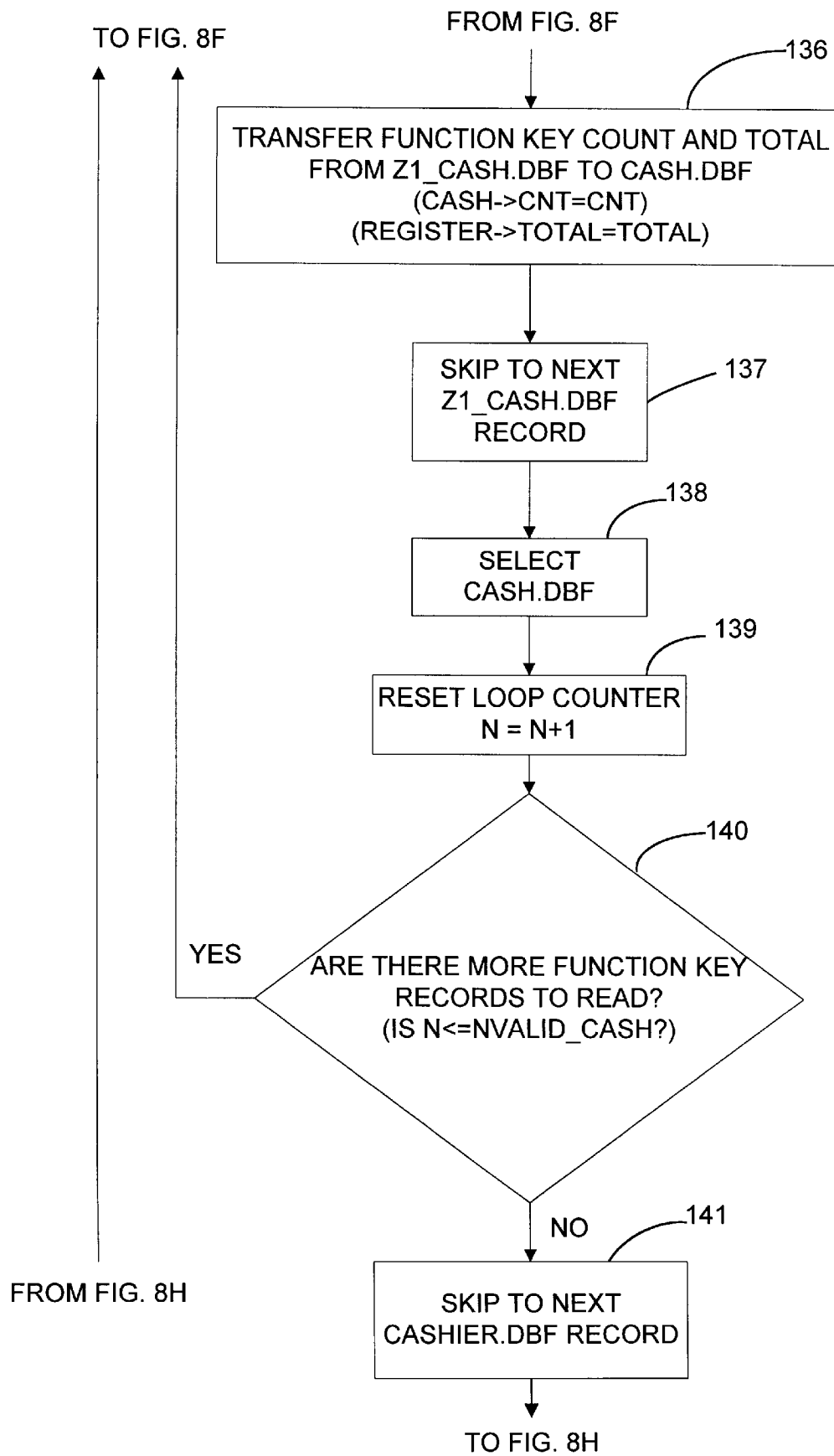
Figure 8H:
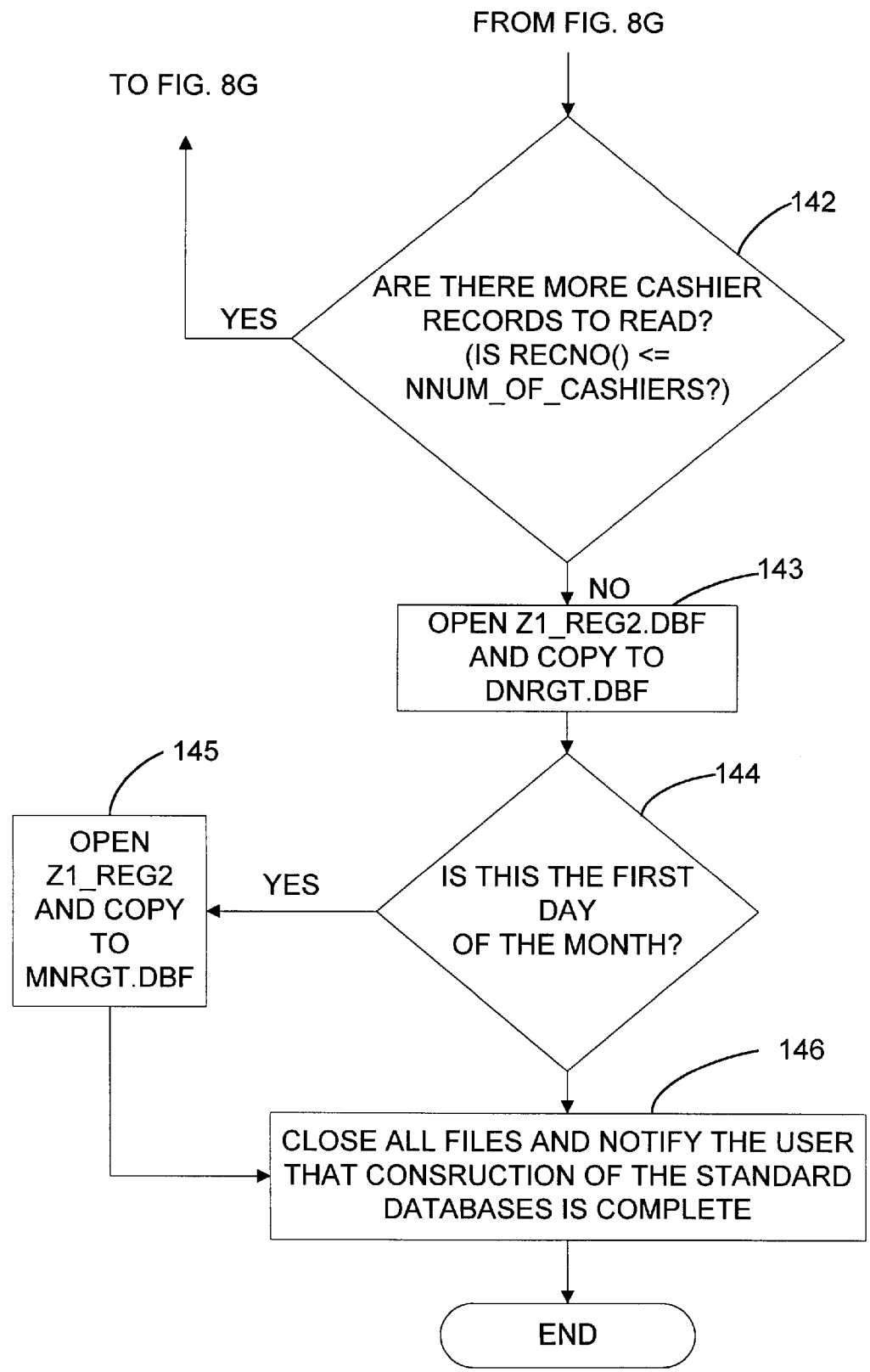

The DNRGT.DBF and MNRGT.DBF standard databases are constructed according to steps 143–146 shown on FIG. 8H. The DNRGT.DBF standard database is constructed by copying the records from the Z1_REG2.DBF raw database (step 143). The MNRGT.DBF standard database is constructed by copying the records from the Z1_REG2.DBF raw database polled on the first day of each month (steps 144–145). All files are then closed and the user notified that the construction of the standard databases is complete (step 146).

The FCONTROL.PRG program listing is set forth in Appendix 1 hereto.

The nomenclature used in the following description of the business rules subsystem corresponds to that used in the description of the interpreter subsystem and in the program listings.

BUSINESS RULES SUBSYSTEM

Figure 10:
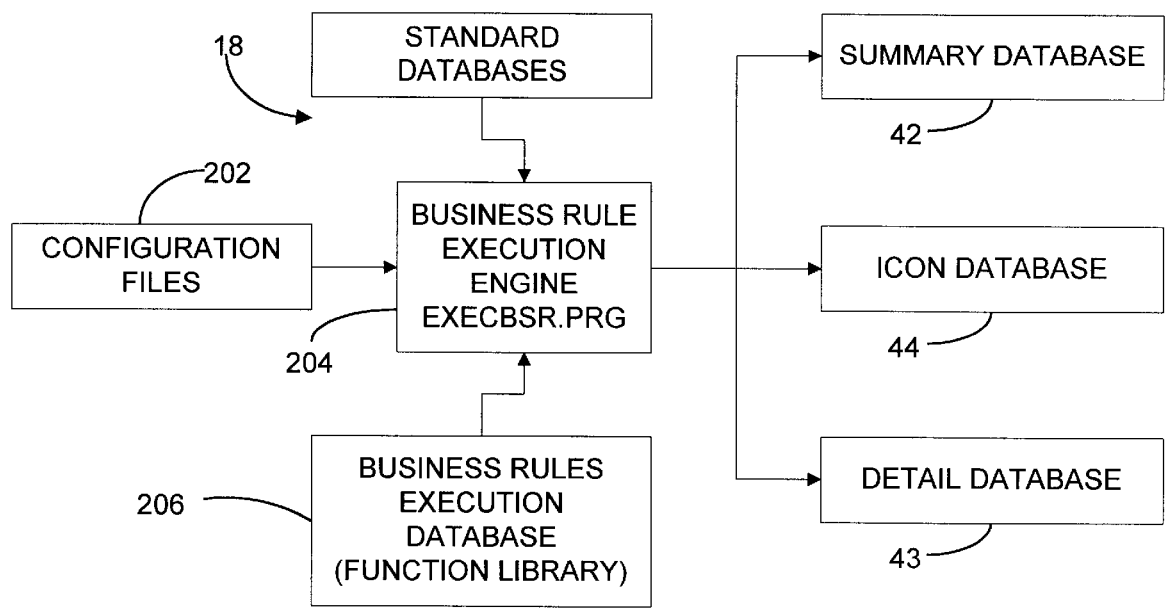
FIG. 10 is a schematic diagram illustrating the basic components of the business rules subsystem.

The business rules subsystem operates on the standard databases to compute object values representing select business activities and then to compare the object values to corresponding predefined reference values. The basic components of the business rules subsystem are illustrated in FIG. 10. The business rules subsystem 18 includes a set of business rules configuration data files 202, the business rule execution engine 204 and the business rule execution database 206. The execution database contains a library of predefined business rules implemented as mathematical/relational functions. Each business activity is represented by a set of mathematical/relational functions. Each function is identified and executed as a stand alone function using data retrieved from the standard databases. Each function returns a single result amount referred to herein as an "object value." The execution engine 204 outputs data into the Summary, Detail, and Icon databases 42, 43 and 44. The business rule execution engine 204 is a data driven program, designated EXECBSR.PRG, that reads a record from the execution database 206 and executes the business rule function stored in that record. The execution engine 204 writes a single numerical value—the object value—and text description for each business activity to the summary database 42. The execution engine also writes the results of intermediate and accumulated ongoing calculations, if any, and applicable error messages to the detail database 43. The business rule programs and functions, may write as much data as is necessary to perform their respective tasks. This data may take the form of detail or summary data.

The Icon database 44 controls the color of the store icons displayed to the user. The store icons are lighted to green to indicate an acceptable (passing) comparison, red to indicate and unacceptable (failing) comparison, or yellow to indicate a questionable (warning) comparison between the computed object values and the corresponding reference values for each business activity.

The business rules configuration data files 202 are used to configure the business rule calculations. The user or operator of the system can customize the business rule calculations and the display of the results of those calculations, if desired, by modifying one or more configuration data files according to a series of menu selections.

In order to illustrate the operation of the business rules subsystem, several exemplary business activities for a fast food service business will be analyzed using the REGIS- TER.DBF standard database constructed by the interpreter subsystem described above. Object values will be computed for gross sales, net sales, discounts, and discounts as a percentage of gross sales and compared to corresponding reference values. The results of the comparisons and the supporting data will then be reported to the user through the display subsystem described below. As will be apparent to those persons familiar with the pertinent business environment and skilled in the art of software engineering, the business rules subsystem can be adapted to analyze any of the various business activities supported by data generated at the point of sale of goods or services. All function key references are to Panasonic® 7500 model series POS terminals.

The computation of the financial controls object values is controlled by a configuration data file through which the user selects the adjustments that will be made to the gross sales. For example, the user may elect to adjust the recorded gross sales for coupon sales or other promotional discounts, employee discounts and the like. To determine the adjustments, the user is presented with the following configuration menu:

GROSS SALES CONFIGURATION MENU

Gross Sales will be determined by the options selected from this Menu. Read the on-line help (F1) to understand how the calculation will be effected. Answer "Y" or "N" to select each option. These options control what data will be used to calculate gross sales.
Coupons . . . (Y/N) Y
Sales Promotions . . . (Y/N) N
Sales Discounts . . . (Y/N) Y
   Universal Discount 1 . . . (Y/N) Y
   Universal Discount 2 . . . (Y/N) N
   Universal Discount 3 . . . (Y/N) N
   Universal Discount 4 . . . (Y/N) N
Negative Departments . . . (Y/N) N
Exclude Sales Tax . . . (Y/N) N The selected items, Coupon sales and Universal Discount 1, constitute the fields of data in the corresponding configuration data file. Thus configured, various financial control object values are computed using the REGISTER.DBF standard database according to the following business rule functions.

Rule FA01—Daily Gross Sales (GS). Selected from REGISTER.DBF.

Rule FA02—Total Sales Adjustments (TSA). TSA= Coupon sales (from REGISTER.DBF)+Universal Discount 1 (from REGISTER.DBF).

Rule FA03—Net Food Sales (NFS). Net food sales is computed by subtracting the negative adjustments selected by the user from Gross Sales (GS): NFS=GS (from REGISTER.DBF)–TSA.

Rule FA04—Net food sales as a percent of gross sales. %NFS=NFS÷GS.

Figure 12:
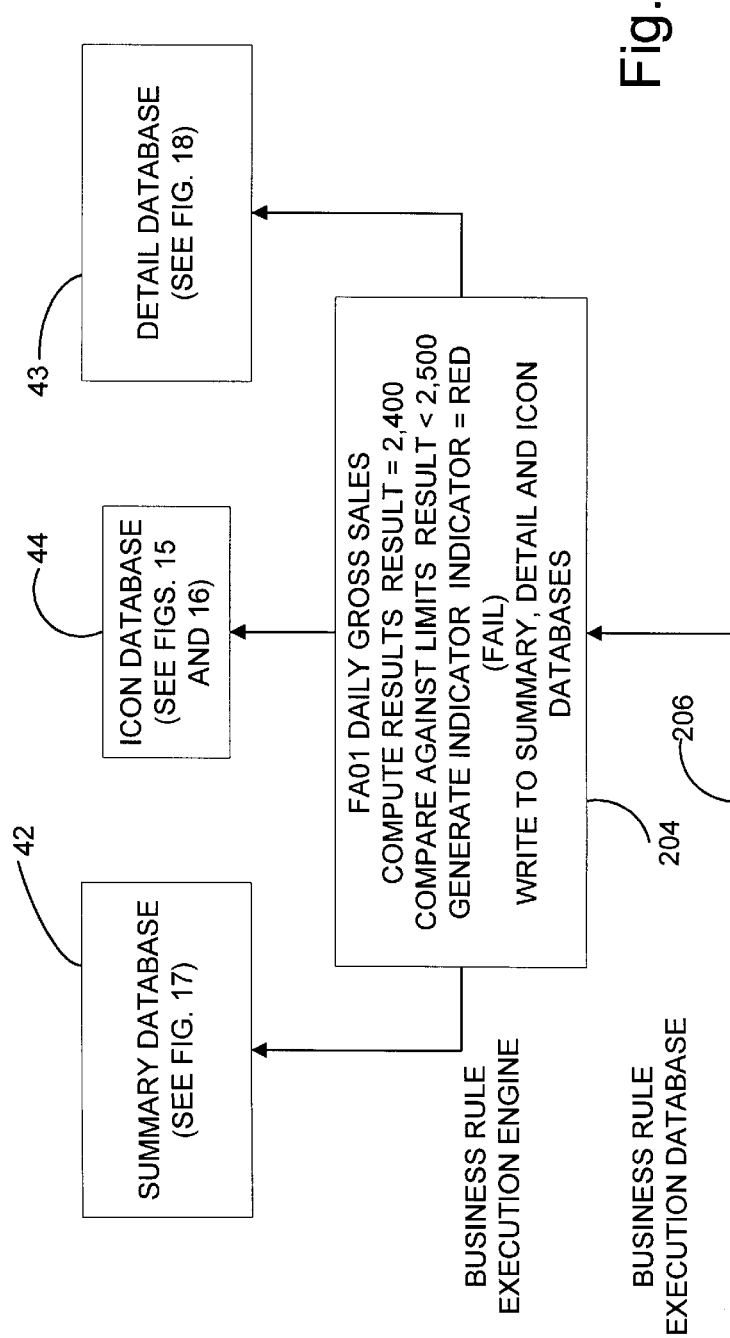
FIG. 12 is a schematic diagram illustrating further details of the operation of the business rules subsystem wherein exemplary data, business rule functions and computations are made according one preferred embodiment of the invention.

The results of the application of these rules to a set of sample data is illustrated in FIG. 12.

Raw data is collected each day, typically at night, through the polling subsystem and stored according to the polling date and the store number wherein the actual raw data is stored (as shown in FIG. 3). The business rule execution engine 204 operates in relation to the current date directory 37. The execution engine 204 is data driven program using a "do loop" and "case structure" with an embedded "read" at the beginning of the loop and an embedded "write" at the end of the loop. The particular business rule function is executed by referencing its name in the program. The execution database 206 contains a library of the business rule functions, the reference values or "limits" for each business activity, data that controls when and in what order the functions are executed and data that controls the summary and detail report databases. The business rule function library is constructed by loading all the business rule functions into a library file in the business rule execution database 206 using a library management utility. This library file consists of a set of program object modules. There is one module for each business rule function. When these modules are linked to the main program, they become an in-line instruction just like read, write, open, close, etc. When one of the business functions is executed, they do work on the standard databases in the same way ADD works on multiple operands. Each function knows what to do and how to do it without arguments or operational variables. A business rule driver reads a business rule function out of the database library, executes the function and writes the object value to the summary report database 42 and the results of intermediate calculations to the detailed report database 43.

Referring to FIG. 12, the execution database 206 contains one record for each business rule function. Each record in the execution database 206 contains the following data.
Field No. 1—Business rule identifier (BSR_ID);
Field No. 2—Business rule description (BSR_DESC);
Field No. 3—Business rule function (BSR_FUNC);
Field No. 4—Pass limit (PASS_LIMIT);
Field No. 5—Warn limit (WARN_LIMIT);
Field No. 6—Fail limit (FAIL_LIMIT);
Field No. 7—Business rule indicator (BSR_IND); and
Field No. 8—Result (BSR_RESULT).

The business rule functions are identified in the BSR_ID field. For example, the function that computes gross sales is identified in the BSR_ID as FA01, the function that computes total sales adjustments is identified as FA02, and so on. Each function description is contained in the BSR_DESC field. The functions themselves are contained in the BSR_FUNC field. The predefined reference values or "limits" for determining whether the computed object values is acceptable (pass), unacceptable (fail) or questionable (warn) are contained in PASS_LIMIT, FAIL_LIMIT, and WARN_LIMIT fields, respectively. The results of the application of the business rule functions are identified in the BSR_RESULT field.

The business rule execution database 206 provides data to the business rule execution engine 204. This data sets up the execution engine 204 to perform the function according to the order established in the BSR_ID, which is the primary index for the execution database 206. The predefined BSR_FUNC process causes the detail database to be created. Each entry in the detail database is different and is based on the function being processed. Icon management is maintained at the detail/summary calculation level. Every time a detail database entry is generated the icon management subroutine is called to evaluate the detail entry and decide if the indicator for the icon being managed should be changed. Each business rule function is programmed the same way. The databases used to supply operands and the results may be different for each function, but the process for transforming the data in question into summary results is the same.

Each record is read from the execution database 206. The BSR_ID is saved to a memory variable to be used during the building of the summary and detailed databases. The same is done with the BSR_DESC text message. The BSR_FUNC is executed by executing the instruction:

RESULT=EXEC_DBF.BSR_FUNC. This is the same as if the routine that read the execution database record called a subroutine to execute the business rule function. During the execution of the function both a result (the object value) and a set of detailed results/messages are created. The result can only be a numeric value or zero. This result can only be a signed numeric value or zero. Each business rule function represents one formula and one result/object value set. The returned result of the BSR_FUNC is assigned to the variable RESULT in the calling routine. The result is then compared to the LIMITS. These limits are the reference values that have been set by default or by the user. The limit comparison is used to set the result indicator color. The composite results indicators are also used to set the icon colors and any error messages. Each icon that is used is accompanied with an error message that describes the state of the icon. These descriptions are either pass, fail or warn. The indicator result, the actual numerical result derived by the function program, BSR_DESC and BSR_ID are written to the summary database 42.

Figure 11:
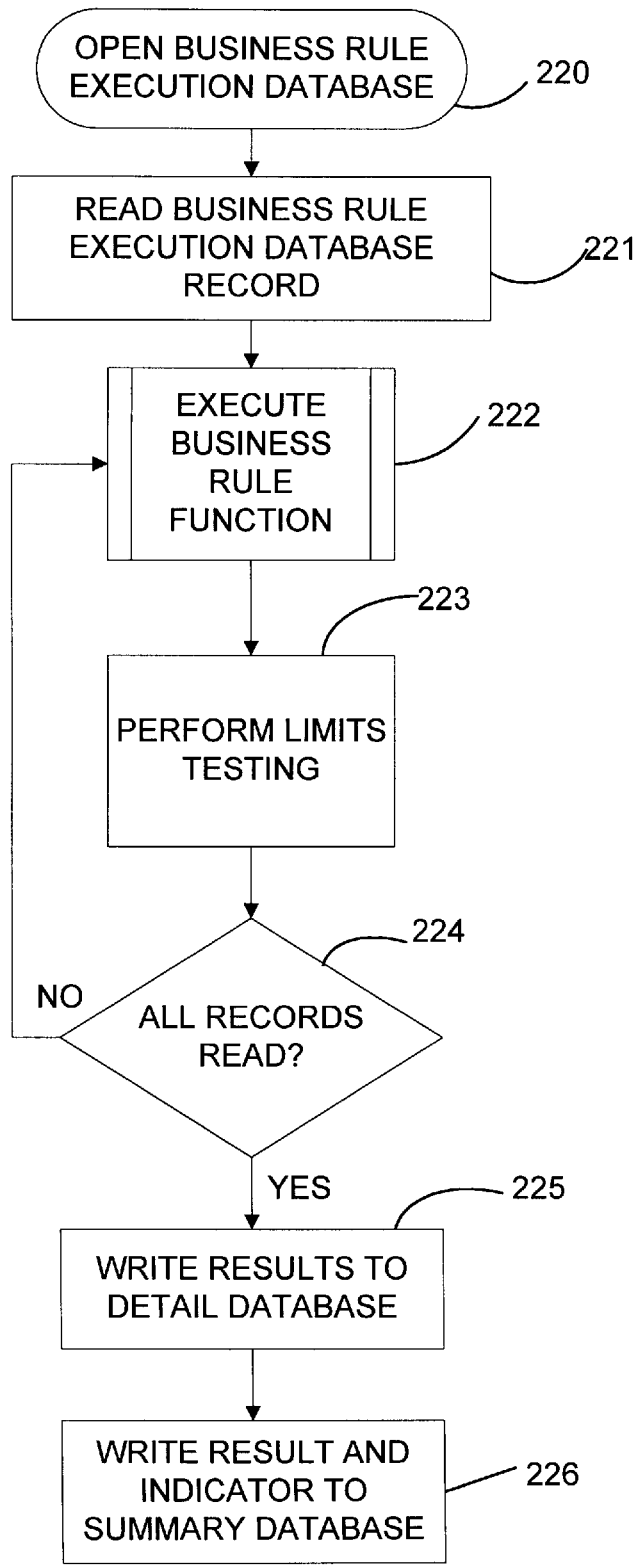
FIG. 11 is a flow chart illustrating the operation of the business rules subsystem.
Figure 13:
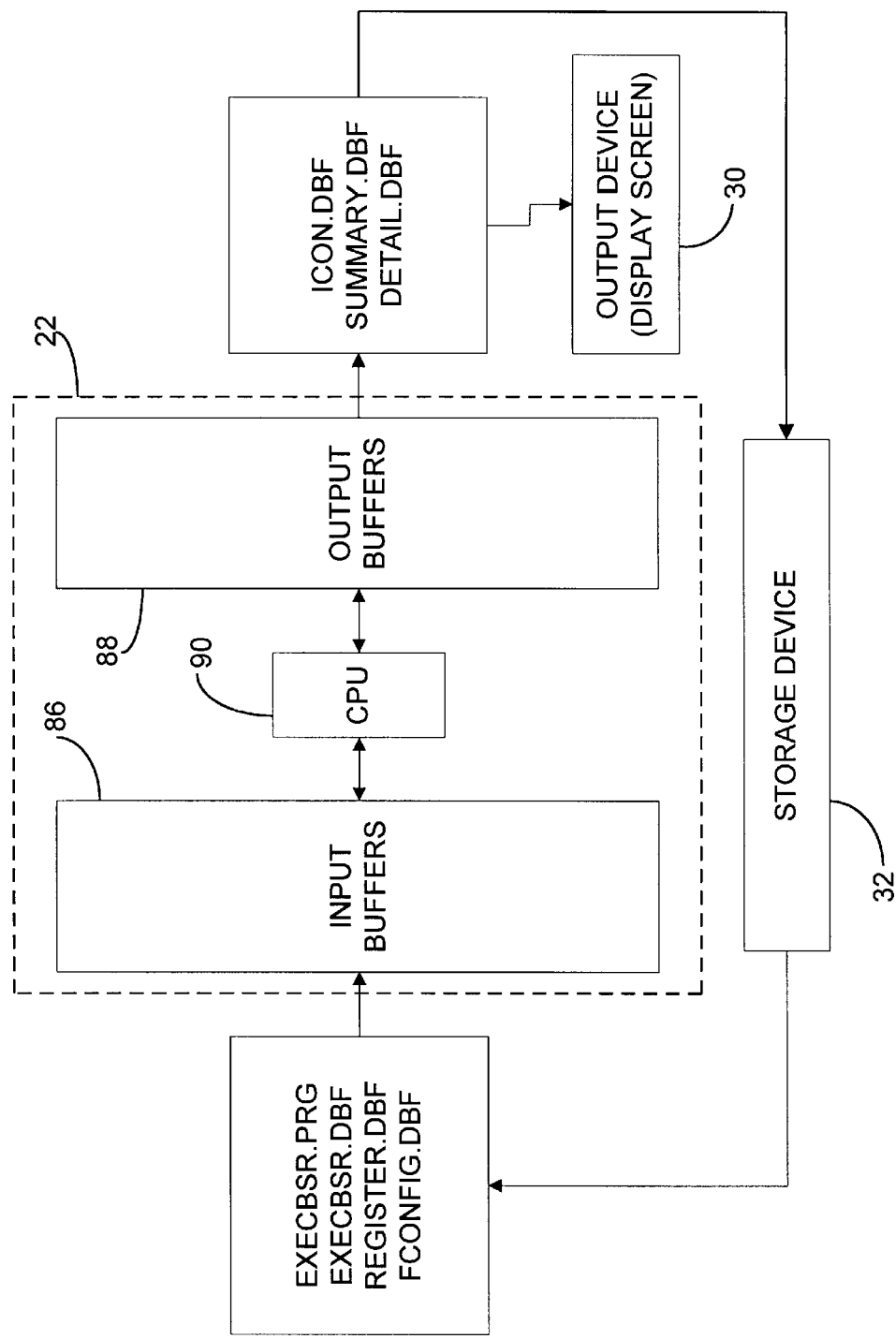
FIG. 13 is a schematic diagram illustrating business rules subsystem data flow through the computer system components used to implement the invention.

The business rule execution process flow, summarized below, is illustrated in FIGS. 11 and 13. The program and database files 210 are read into the CPU memory input buffers 86 from storage device 32. The following steps are then executed according to the program commands in the execution database 206:

---
Docket No. SAPS101
---
OPEN the execution database (step 220);
READ the first record into a memory buffer called EXEC_DBF (step 221);
DO WHILE not end of file;
RESULT = EXEC_DBF.BSR_FUNC (execute the business rule function, step 222);
DO CASE (test the results against the predefined limits, step 223);
    CASE RESULT less than PASS LIMIT - Indicator = PASS
    CASE RESULT greater than FAIL LIMIT - Indicator = FAIL
    CASE RESULT greater than PASS LIMIT
        but less then FAIL LIMIT - Indicator = WARN
END CASE;
WRITE RESULT to Summary Report database file (step 226);
WRITE INDICATOR to Summary Report database file (step 226);
READ the next execution record into EXEC_DBF; and
END DO LOOP.
---

Referring to FIG. 13, the data read from the storage device into the input buffers is processed in the CPU processing means 90 according to the control program logic set forth above (as illustrated in FIG. 11) to compute the object values and compare the object values to the predefined reference values. The results are written from the CPU memory output buffers 88 back to the storage device 32 and/or to output device 30 where they are displayed to the user as shown in FIGS. 14–18. Once the summary record is written to the summary database, the result Indicator is reset to PASS and a new execution record is read from the execution database file. The store icon Indicator is reset at the beginning of the analysis session. Therefore, each store and each result Indicator starts off in the pass state so that if either the store or result Indicator icons are in any other state, the state change could have only occurred if a business rule function returned a result that did not compare favorably to its reference value.

Each execution function also writes a set of results to the detailed database. These results may include results of intermediate calculations, accumulated results of on-going calculations and/or error messages, if any. For example, if the daily sales tax function is being executed to compute accumulated daily sales tax and the polling date is the tenth day of the month, then the detailed report would include ten days of accumulated sales taxes as an incrementing subtotal of the daily tax as well as that particular day's sales tax. If the accumulated tax comparison failed, then the user could review the detailed report to determine when the unacceptable comparison occurred. The data written to the summary and detailed report databases is illustrated below.

SUMMARY DATABASE

Field No. 1—Business rule identifier (BSR_ID);

Field No. 2—Business rule result/object value (BSR_RESULT);

Field No. 3—Indicator (BSR_IND); and

Field No. 4—Business rule description (BSR_DESC).

DETAIL DATABASE

Field No. 1—Business rule function (BSR_FUNC);

Field No. 2—Business rule identifier (BSR_ID);

Field No. 3—Detail text message (MSG);

Field No. 4—Detail intermediate result (INT_RESULT); and

Field No. 5—Indicator (BSR_IND).

The business rule execution engine, EXECBSR.PRG program listing is set forth in Appendix 1 hereto.

DISPLAY SUBSYSTEM

Figure 14:
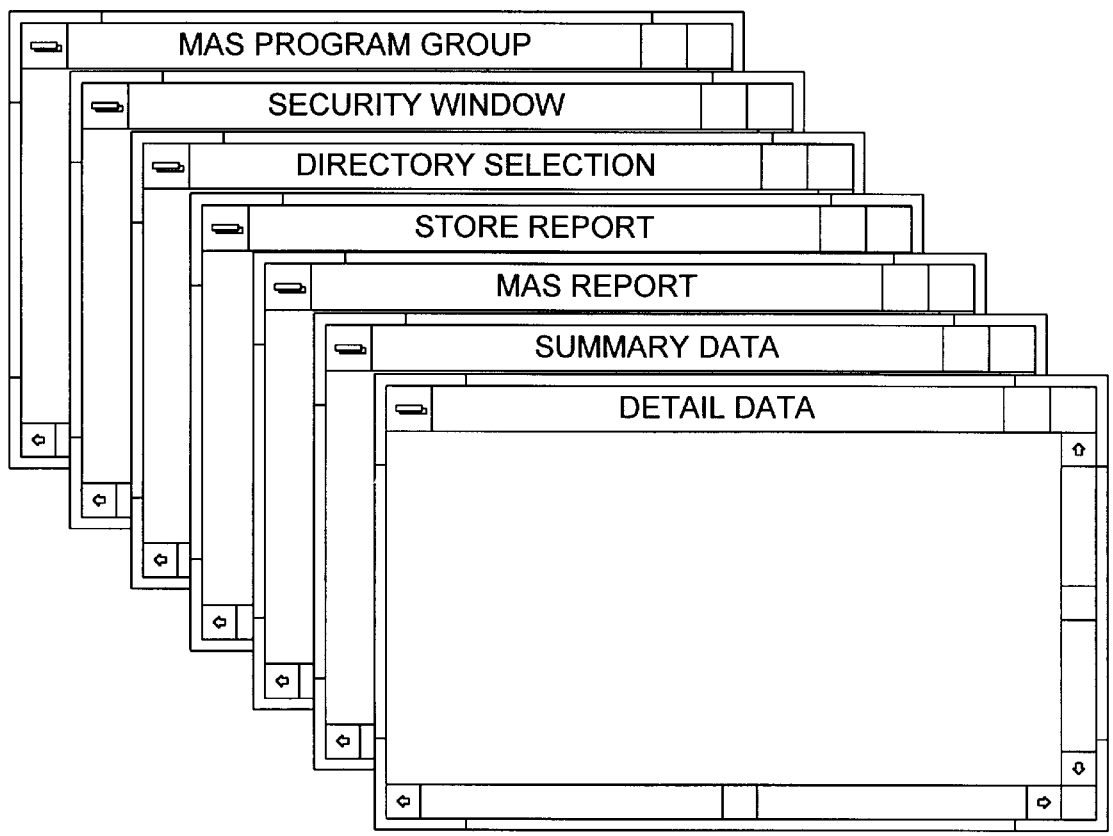
FIG. 14 is a pictorial representation of the display subsystem presentation hierarchy displayed to the user through the computer output device.
Figure 15:
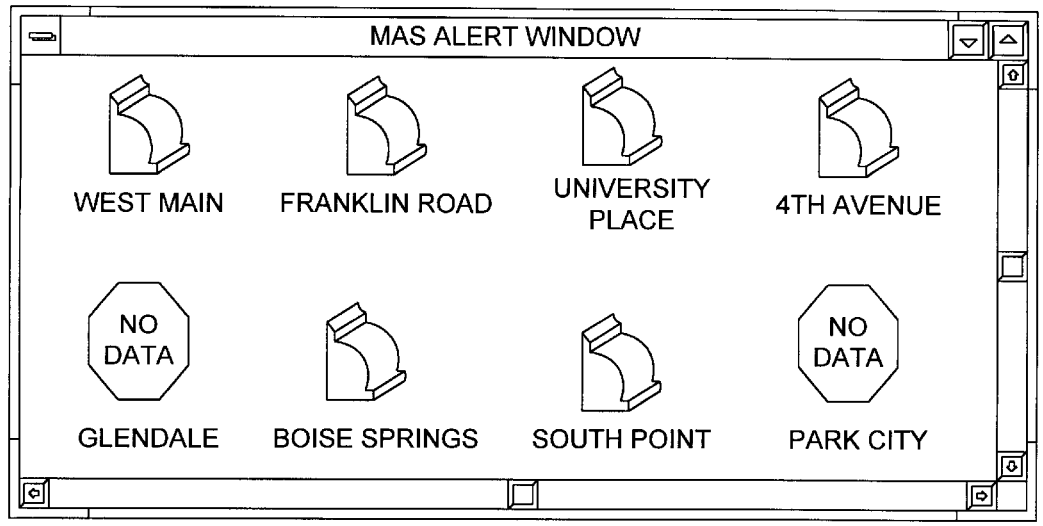
FIG. 15 is a pictorial representation of the first level of results displayed to the user wherein store icons are displayed and highlighted to reflect the results of the computations and comparisons made by the business rules subsystem.

The results of the comparisons (i.e., pass, fail or warn), and the summary and detail database reports are presented to the user in a Windows™ format through output device 30, which is preferably a color monitor. FIG. 14 shows the overall Management Alert™ system presentation hierarchy beginning with the user's entry into the system. The Program Group window holds the Management Alert™ icon and is the entry point into the system. To enter the system, the user selects the Management Alert™ icon and the Directory Selection window is displayed. The Directory Selection window displays the polling dates and allows the user to select the data to be analyzed by polling date. The Directory Selection defaults to the current date.

Figure 16:
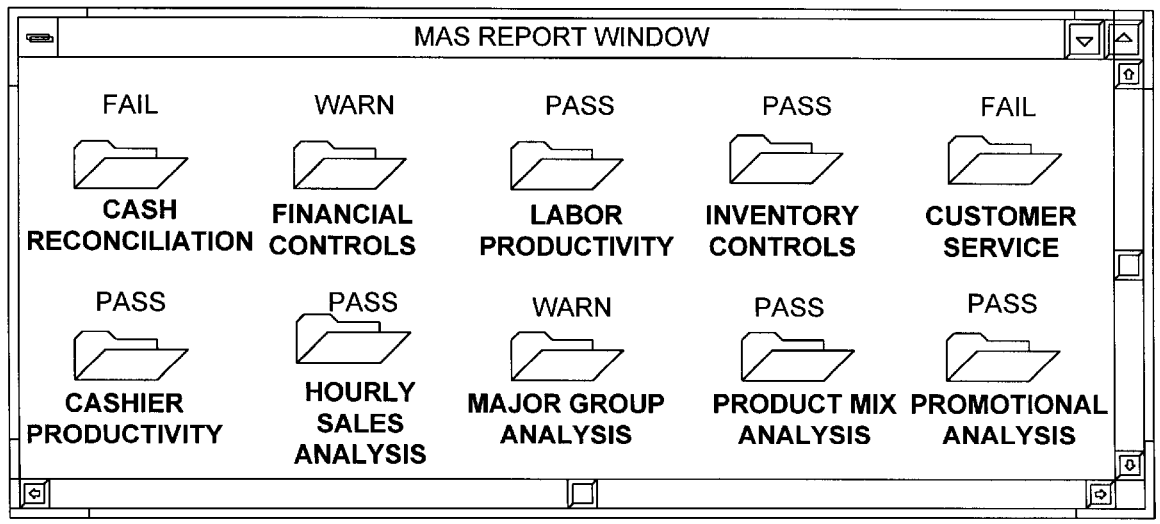
FIG. 16 is a pictorial representation of the second level of results displayed to the user wherein business activity icons are displayed and highlighted to reflect the results of the computations and comparisons made by the business rules subsystem.

In a typical display session, the user is presented with a set of prompts that lead through successively more detailed information until the cause of a questionable or unacceptable comparison can be determined. There are four levels of presentation. In the first level, shown in FIG. 15, the store icons are presented in the Alert Window. The color of each store icon is controlled by the ICON.DBF data file wherein the results of the comparison are stored. The user sees an icon for each store from which data was polled lighted to a particular color indicating a pass (green), fail (red) or warn (yellow). A store will "pass" only if the comparison of all object and reference values for all business activities for that store are acceptable. If even one business activity comparison is questionable or unacceptable, then the store icon will be lighted to fail or warn to indicate that at least one business activity had an unacceptable or questionable comparison. The user can reach the second level, shown on FIG. 16, by selecting any store of interest. For example, if the West Main store icon was lighted red, indicating a "fail" or unacceptable comparison between at least one of the object values and the corresponding reference values, then the user would select the West Main store icon to view that store's report icons. Referring to FIG. 16, each business activity is represented by an icon lighted to indicate the results of the comparisons made within the business rules applicable to that activity. Again, the icons are lighted green to indicate an acceptable comparison, yellow to indicate a questionable comparison or red to indicate an unacceptable comparison.

The user can then reach the summary database reports in the third level of presentation shown in FIG. 17 by selecting any of the activity icons. The third level presents the summary report for each business activity. Each summary report contains the computed object values and the other data noted above. The fourth level is accessed by selecting the object value/reference value combination of interest. Referring to FIG. 18, the fourth level presents the user will the detailed database report for each business activity. As noted above, the detailed report database displays all computations made with the business rule functions as well as applicable text messages. In this way, the user is alerted to anomalous performance in any of the selected business activities being evaluated and the cause of the anomalous performance.

There has been shown and described a novel computer based system for monitoring and processing point of sale data to allow business managers to more fully utilize point of sale data to evaluate and manage business activities. The use of the disclosed database implemented interpreter and business rule execution engine minimizes the time required to monitor and process point of sale data and reduces the time and expense required to implement changes to reference values for select business activities, formulas for computing actual values for such activities and variables used to compute those actual values. The particular embodiments shown in the drawings and described herein are for purposes of example and should not be construed to limit the invention as set forth in the appended claims. Those skilled in the art may now make numerous uses and modifications of the specific embodiments described herein without departing from the scope of the invention.

We claim:

1. A computer program product that can be used to direct a computer to monitor and process raw data collected by electronic point of sale terminals, the raw data being stored in a set of raw databases having a known configuration, the computer program product comprising:
   a. a computer usable storage medium having computer readable program code embodied therein for monitoring and processing data collected by a plurality of point of sale terminals;
   b. interpreter program code for causing the computer to transform raw databases into standard databases having a predefined standardized configuration; and
   c. business rules program code for causing the computer to derive an object value from standard databases for each of one or more selected business activities and to compare the object values to corresponding predefined reference values for each selected business activity.

2. A computer program product according to claim 1, further comprising identification program code for causing the computer to identify a pass condition representative of an acceptable comparison, a fail condition representative of an unacceptable comparison, or a warn condition representative of a questionable comparison.

3. A computer program product according to claim 2, further comprising display program code for causing the computer to display the identified condition to a user.

4. A computer program product according to claim 1, wherein the interpreter program code comprises one or more control programs for causing the computer to selectively transfer raw data from the raw databases to the standard databases.

5. A computer program product according to claim 4, wherein the control programs contain information defining the configuration of the raw databases and the standard databases, each control program containing a part of the definition information, and the definition information having a first scheme representative of the configuration of the raw databases to allow the control programs to cause the computer to retrieve select raw data from the raw databases and a second scheme representative of the standard databases to allow the control programs to cause the computer to transfer data into the standard databases so that such data are accessible by the business rule program code.

6. A computer program product according to claim 5, wherein the interpreter program code further comprises configuration code for causing the computer to assign descriptions to select raw data, wherein the descriptions are used by the control programs to identify the raw data upon its transfer to the standard databases.

7. A computer program product according to claim 1, wherein the business rules program code comprises:
   a. program code for causing the computer to store a set of mathematical/relational functions in a business rule execution database, wherein each mathematical/relational function defines an object value for each business activity;
   b. program code for causing the computer to link a business rule execution engine to the business rule execution database and the standard databases, the business rule execution engine being configured therein to cause the computer to compute an object value for each business activity according to the corresponding mathematical/relational function and to compare the object values and the corresponding reference values.

8. A computer program product according to claim 7, wherein the business rule execution engine is further configured to identify a pass condition representative of an acceptable comparison, a fail condition representative of an unacceptable comparison, or a warn condition representative of a questionable comparison.

9. A computer program product according to claim 8, wherein the business rules execution engine comprises:
   a. read means for causing the computer to read a record from the business rule execution database wherein each record contains one of the mathematical/relational functions and the corresponding reference value;
   b. processor means for causing the computer to compute an object value in accordance with the mathematical/relational function;
   c. comparison means for causing the computer to compare the object value to the reference value; and
   d. identification means for causing the computer to identify the comparison of the object value to the reference value as a pass condition representative of an acceptable comparison, a fail condition representative of an unacceptable comparison, or a warn condition representative of a questionable comparison.

10. A computer program product according to claim 9, further comprising write means for causing the computer to write the object value to a summary database.

11. A computer program product according to claim 9, further comprising display means for causing the computer to alert the user to the comparison as a pass, fail or warn.

12. A computer program product according to claim 7, further comprising configuration program code for allowing the user to modify the mathematical/relational functions to re-define the relationship between the raw data and the business activities.

13. A computer system for monitoring and processing raw data collected by a plurality of electronic point of sale terminals, the system comprising:
   a. a central processing unit (CPU);
   b. storage means, electronically coupled to the CPU, for storing data, the storage means being partitioned into a plurality of memory partitions and wherein the raw data is stored in a first one of the memory partitions and a set of predefined reference values for selected business activities are stored in a second one of the memory partitions;
   c. interpreter means, electronically coupled to the CPU, for transforming the raw data into one or more databases having a predefined standardized configuration and for storing the transformed data in a third one of the memory partitions;
   d. computing means, electronically coupled to the CPU, for deriving object values from the transformed data, each object value being representative of one of the selected business activities; and
   e. comparing means, electronically coupled to the CPU, for comparing object values and corresponding reference values.

14. A computer system according to claim 13, further comprising input means, electronically coupled to the CPU, for polling each of the electronic point of sale terminals and for storing raw data retrieved therefrom in the first one of the memory partitions.

15. A computer system according to claim 13, further comprising identification means, electronically coupled to the CPU, for identifying a pass condition representative of an acceptable comparison, a fail condition representative of an unacceptable comparison or a warn condition representative of a questionable comparison.

16. A computer system according to claim 15, further comprising output means, electronically coupled to the CPU, for outputting the identified condition.

17. A computer system according to claim 15, further comprising display means, electronically coupled to the CPU, for displaying the identified condition to a user.

18. A computer system for monitoring and processing raw data collected by electronic point of sale terminals, the raw data being stored in a set of raw databases having a known configuration, the system comprising:
   a. a central processing unit (CPU);
   b. a data interpreter, electronically coupled to the CPU, comprising means for transforming raw databases into standard databases having a predefined standardized configuration; and
   c. a business rules subsystem, electronically coupled to the CPU and operative on the standard databases, comprising means for computing an object value for each of one or more select business activities and for comparing the object values and corresponding predefined reference values for each selected business activity.

19. A system according to claim 18, wherein the business rules subsystem further comprises means for identifying a pass condition representative of an acceptable comparison, a fail condition representative of an unacceptable comparison or a warn condition representative of a questionable comparison.

20. A system according to claim 19, further comprising display means, electronically coupled to the CPU, for displaying the identified condition to a user.

21. A system according to claim 18, wherein the data interpreter further comprises one or more computer control programs for selectively transferring raw data from the raw databases to the standard databases.

22. A computer system according to claim 21, wherein the control programs contain information defining the configuration of the raw databases and the standard databases, each control program containing a part of the definition information, and the definition information having a first scheme representative of the configuration of the raw databases to allow the control programs to retrieve select raw data from the raw databases and a second scheme representative of the standard databases to allow the control programs to transfer data into the standard databases so that such data are accessible for the business rules subsystem.

23. A computer system according to claim 21, wherein the data interpreter further comprises one or more configuration data files for assigning descriptions to select raw data, said descriptions being used by the control programs to identify the raw data upon its transfer to the standard databases.

24. A computer system according to claim 18, further comprising a storage means, electronically coupled to the CPU, for storing data, the storage means being partitioned into a plurality of memory partitions, a first one of the memory partitions having a directory structure therein for storing the raw databases according to the date on which the raw data was polled.

25. A computer system according to claim 18, further comprising a storage means, electronically coupled to the CPU, for storing data, the storage means being partitioned into a plurality of memory partitions, a first one of the memory partitions having a directory structure therein for storing the raw databases according to the store from which the raw data was polled.

26. A computer system according to claim 18, wherein the business rules subsystem further comprises:
   a. a business rule execution database for storing a set of mathematical/relational functions, wherein each mathematical/relational function defines an object value for each business activity; and
   b. a business rule execution engine linked to the business rule execution database and the standard databases, the business rule execution engine being adapted to (i) compute an object value for each business activity according to the corresponding mathematical/relational function, (ii) compare the object values and the corresponding reference values, and (iii) identify a pass condition representative of an acceptable comparison, a fail condition representative of an unacceptable comparison, or a warn condition representative of a questionable comparison.

27. A computer system according to claim 26, wherein the business rules execution engine comprises:
   a. means for reading a record from the business rule execution database wherein each record contains one of the mathematical/relational functions and the corresponding reference value;
   b. means for computing an object value in accordance with the mathematical/relational function;
   c. means for comparing the object value to the reference value; and
   d. means for identifying the comparison of the object value to the reference value as a pass condition representative of an acceptable comparison, a fail condition representative of an unacceptable comparison, or a warn condition representative of a questionable comparison.

28. A computer system according to claim 27, further comprising means for writing the object value to a summary database.

29. A computer system according to claim 27, further comprising means for alerting the user to the comparison as a pass, fail or warn.

30. A computer system for displaying anomalous business activities, comprising:
   a. storage means for storing user data;
   b. interpreter means operative on the user data for transforming the user data into a predefined standardized configuration; and
   c. processing means operative on the transformed user data for processing the user data according to business rule functions, wherein object values representative of selected business activities are derived from the transformed user data, and for comparing the object values to predefined reference values for the selected business activities.

31. A computer system according to claim 30, further comprising identification means operatively coupled to the processing means for identifying one from the group consisting of a pass condition, the pass being representative of an acceptable comparison of the object value and the reference value, a fail condition, the fail condition being representative of an unacceptable comparison of the object value and the reference value, and a warn condition, the warn condition being representative of a questionable comparison of the object value and the reference value.

32. A computer system according to claim 31, further comprising display means operatively coupled to the identification means for displaying the identified condition to the user.

33. In an electronic database storage and computing system, a method for monitoring and processing raw data collected by electronic point of sale terminals, the raw data being stored in a set of raw databases having a known configuration, the method comprising the steps of:
   a. selectively transferring raw data from the raw databases to standard databases having a predefined standardized configuration according to one or more computer control programs;
   b. deriving one or more object values from standard databases, each object value being representative of a selected business activity;
   c. defining reference values for each of the selected business activities;
   d. comparing the object values to the corresponding reference values; and
   e. wherein the computer control programs contain information that defines the configuration of the raw databases and the standard databases, each control program containing a part of the definition information and the definition information having a first scheme representative of the configuration of the raw databases to allow the control programs to cause the computer to retrieve select raw data from the raw databases and a second scheme representative of the standard databases to allow the control proarams to cause the computer to transfer data into the standard databases so that such data are accessible for deriving object values.

34. A method according to claim 33, further comprising the step of identifying a pass condition representative of an acceptable comparison, a fail condition representative of an unacceptable comparison, or a warn condition representative of a questionable comparison.

35. A method according to claim 34, further comprising the step of displaying the identified condition to a user.

36. A method according to claim 33, further comprising the steps of:
   a. storing a set of mathematical/relational functions in a business rule execution database, wherein each mathematical/relational function defines an object value for each business activity; and
   b. linking a business rule execution engine to the business rule execution database and the standard databases, the business rule execution engine being configured to cause the computer to compute an object value for each business activity according to the corresponding mathematical/relational function and to compare the object values and the corresponding reference values.

37. A method according to claim 36, further comprising the steps of:
   a. reading a record from the business rule execution database wherein each record contains one of the mathematical/relational functions and the corresponding reference value; and
   b. computing an object value in accordance with the mathematical/relational function.

38. A method according to claim 37, further comprising the step of writing the object value to a summary database.

39. A method according to claim 37, further comprising the step of identifying the comparison of the object value to the reference value as a pass condition representative of an acceptable comparison, a fail condition representative of an unacceptable comparison, or a warn condition representative of a questionable comparison.

40. A method according to claim 39, further comprising the step of alerting the user to the comparison as a pass, fail or warn.

41. A method for identifying and displaying anomalous business activities for business activities that are reflected in data collected at a point of sale of goods and services, the method using a programmable computer for performing the steps of:
   a. storing user data collected at the point of sale;
   b. processing the user data according to predefined business rule functions whereby the user data is transformed into object values for select business activities;
   c. comparing the object values to predefined reference values for each selected business activity;
   d. identifying one from the group consisting of a pass condition, the pass being representative of an acceptable comparison of the object value and the reference value, a fail condition, the fail condition being representative of an unacceptable comparison of the object value and the reference value, and a warn condition, the warn condition being representative of a questionable comparison of the object value and the reference value; and
   e. displaying the identified condition to the user.

* * * * *